United States Patent
Barole et al.

(10) Patent No.: US 12,530,636 B2
(45) Date of Patent: Jan. 20, 2026

(54) SYSTEM AND METHOD FOR VEHICLE DEFECT DETECTION

(71) Applicant: Transportation IP Holdings, LLC, Norwalk, CT (US)

(72) Inventors: Somnath Barole, Bangalore (IN); Rithesh M, Bangalore (IN); Vishram Nandedkar, Bangalore (IN); Krishnamurthy Vaidyanathan, Bangalore (IN); James D Brooks, Grove City, PA (US); Guangliang Zhao, Niskayuna, NY (US); Weina Ge, San Ramon, CA (US); Peter Tu, Niskayuna, NY (US); Derek K. Woo, Melbourne, FL (US); Daniel J. Rush, Saint Charles, IL (US); Adam Franco, Melbourne, FL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/412,836

(22) Filed: Jan. 15, 2024

(65) Prior Publication Data

US 2025/0156774 A1 May 15, 2025

Related U.S. Application Data

(63) Continuation-in-part of application No. 17/152,631, filed on Jan. 19, 2021, now Pat. No. 11,875,284.
(Continued)

(51) Int. Cl.
*G06Q 10/04* (2023.01)
*B61L 25/02* (2006.01)
(Continued)

(52) U.S. Cl.
CPC ............ *G06Q 10/04* (2013.01); *B61L 25/028* (2013.01); *B61L 25/04* (2013.01); *G06F 18/21* (2023.01);
(Continued)

(58) Field of Classification Search
CPC ...... G06Q 10/04; G06Q 10/087; G06Q 50/40; B61L 25/028; B61L 25/04; B61L 23/041;
(Continued)

(56) References Cited

U.S. PATENT DOCUMENTS

| 4,302,811 A | 11/1981 | McElhenny |
| 7,328,871 B2 | 2/2008 | Mace et al. |

(Continued)

FOREIGN PATENT DOCUMENTS

| AU | 2015261670 A | 12/2015 |
| AU | 2015347772 A | 6/2017 |

(Continued)

*Primary Examiner* — Florian M Zeender
*Assistant Examiner* — Kimberly S. Bursum
(74) *Attorney, Agent, or Firm* — K&L Gates LLP

(57) ABSTRACT

A defect detection system includes one or more route optical sensors configured to generate image data depicting an underbody of a vehicle that is on a route. The defect detection system also includes a controller configured to input the image data generated by the one or more route optical sensors into a first machine learning algorithm that determines an area of interest in the image data. The area of interest contains equipment of interest. The controller is configured to input the image data that is within the area of interest into a second machine learning algorithm that detects a defect on the equipment of interest. The controller is configured to perform at least one responsive action based on a type of defect that is detected.

19 Claims, 10 Drawing Sheets

Related U.S. Application Data which is a continuation of application No. 16/861,805, filed on Apr. 29, 2020, now Pat. No. 11,755,965.

(60) Provisional application No. 62/840,891, filed on Apr. 30, 2019.

(51) Int. Cl.

| | | |
|---|---|---|
| *B61L 25/04* | (2006.01) | |
| *G06F 18/21* | (2023.01) | |
| *G06N 3/04* | (2023.01) | |
| *G06N 3/08* | (2023.01) | |
| *G06Q 10/087* | (2023.01) | |
| *G06Q 50/40* | (2024.01) | |
| *G06T 7/20* | (2017.01) | |
| *G06V 20/00* | (2022.01) | |
| *G06V 20/62* | (2022.01) | |
| *G06V 30/10* | (2022.01) | |
| *G06V 30/14* | (2022.01) | |
| *G06V 30/19* | (2022.01) | |
| *G06V 30/224* | (2022.01) | |
| *G06V 40/20* | (2022.01) | |

(52) U.S. Cl.
CPC ............. *G06N 3/04* (2013.01); *G06N 3/08* (2013.01); *G06Q 10/087* (2013.01); *G06Q 50/40* (2024.01); *G06T 7/20* (2013.01); *G06V 20/00* (2022.01); *G06V 20/62* (2022.01); *G06V 30/1429* (2022.01); *G06V 30/1448* (2022.01); *G06V 30/19173* (2022.01); *G06V 30/2253* (2022.01); *G06V 40/25* (2022.01); *G06T 2207/20081* (2013.01); *G06T 2207/20084* (2013.01); *G06V 30/10* (2022.01); *G06V 2201/07* (2022.01)

(58) Field of Classification Search
CPC ...... B61L 25/021; B61L 25/023; B61L 27/57; G06F 18/21; G06N 3/04; G06N 3/08; G06T 7/20; G06T 2207/20081; G06T 2207/20084; G06V 20/00; G06V 20/62; G06V 30/1429; G06V 30/1448; G06V 30/19173; G06V 30/2253; G06V 40/25; G06V 30/10; G06V 2201/07
See application file for complete search history.

(56) References Cited

U.S. PATENT DOCUMENTS

| | | | |
|---|---|---|---|
| 7,492,861 | B2 | 2/2009 | Chen et al. |
| 7,564,569 | B2 | 7/2009 | Mian et al. |
| 7,714,886 | B2 | 5/2010 | Kilian et al. |
| 7,746,379 | B2 | 6/2010 | Jesson et al. |
| 7,889,931 | B2 | 2/2011 | Webb et al. |
| 8,006,559 | B2 | 8/2011 | Mian et al. |
| 8,140,250 | B2 | 3/2012 | Mian et al. |
| 8,150,105 | B2 | 4/2012 | Mian et al. |
| 8,224,510 | B2 | 7/2012 | Daum et al. |
| 8,245,983 | B2 | 8/2012 | Gilbertson |
| 8,335,606 | B2 | 12/2012 | Mian et al. |
| 8,649,932 | B2 | 2/2014 | Mian et al. |
| 8,818,585 | B2 | 8/2014 | Bartonek et al. |
| 8,925,873 | B2 | 1/2015 | Gamache |
| 9,454,816 | B2 | 9/2016 | Mian et al. |
| 9,663,127 | B2 | 5/2017 | Palmer et al. |
| 9,710,720 | B2 | 7/2017 | Mitti et al. |
| 9,846,025 | B2 | 12/2017 | Kirchner et al. |
| 9,908,546 | B2 | 3/2018 | Palmer et al. |
| 10,007,981 | B2 | 6/2018 | Gangitano et al. |
| 10,108,881 | B2 | 10/2018 | Xu et al. |
| 10,136,106 | B2 | 11/2018 | Shubs, Jr. et al. |
| 10,196,078 | B2 | 2/2019 | Shubs, Jr. et al. |
| 10,204,268 | B2 | 2/2019 | Xu et al. |
| 10,864,928 | B2 | 12/2020 | Shubs, Jr. et al. |
| 10,919,546 | B1 | 2/2021 | Llorenty |
| 10,970,851 | B2 | 4/2021 | Mian et al. |
| 10,984,521 | B2 | 4/2021 | Kohler et al. |
| 10,992,860 | B2 | 4/2021 | Liang et al. |
| 11,755,965 | B2 | 9/2023 | Brooks et al. |
| 11,875,284 | B2 | 1/2024 | Brooks et al. |
| 2004/0093186 | A1 | 5/2004 | Ebert et al. |
| 2006/0076461 | A1 | 4/2006 | DeRose et al. |
| 2006/0180760 | A1 | 8/2006 | Lane et al. |
| 2007/0075192 | A1 | 4/2007 | Mian et al. |
| 2010/0258682 | A1 | 10/2010 | Fries et al. |
| 2015/0344048 | A1 | 12/2015 | Kernwein |
| 2017/0255824 | A1 | 9/2017 | Miller et al. |
| 2019/0002002 | A9 | 1/2019 | Fahmy et al. |
| 2019/0095725 | A1 | 3/2019 | Kalghatgi et al. |
| 2019/0176862 | A1 | 6/2019 | Kumar et al. |
| 2020/0322545 | A1* | 10/2020 | Magnuszewski ...... H04N 23/55 |
| 2020/0408682 | A1 | 12/2020 | Mian et al. |
| 2022/0172335 | A1 | 6/2022 | Mian et al. |

FOREIGN PATENT DOCUMENTS

| | | |
|---|---|---|
| AU | 2019396832 B2 | 7/2021 |
| EP | 1600351 B1 | 1/2007 |
| EP | 2093561 B1 | 2/2016 |
| WO | 2018037355 A1 | 3/2018 |

* cited by examiner

SYSTEM AND METHOD FOR VEHICLE DEFECT DETECTION

CROSS-REFERENCE TO RELATED APPLICATIONS

This application is a continuation-in-part of U.S. application Ser. No. 17/152,631 (the "'631 Application"), filed 19 Jan. 2021, which is a continuation of U.S. application Ser. No. 16/861,805 (the "'805 Application"), filed on 29 Apr. 2020 and issued as U.S. Pat. No. 11,755,965. The '805 Application claims priority to U.S. Provisional Application No. 62/840,891 (the "'891 Application"), which was filed on 30 Apr. 2019. The entire disclosures of the '631 Application, the '805 Application, and the '891 Application are incorporated herein by reference.

BACKGROUND

Technical Field

The inventive subject matter described herein relates to detecting defects along the underbodies of vehicle systems.

Discussion of Art

Inspection of equipment along the underbody (e.g., underside) of vehicle systems is difficult due in part to restricted access to the underbody. Furthermore, some vehicle systems include hundreds of discrete vehicles (e.g., assets), so the inspection task is physically daunting and time-consuming. For example, some operators manually inspect the wheels, axles, and traction motors, collectively referred to herein as combo units, of a train during regularly scheduled maintenance events and in response to an on-route failure of the train. Furthermore, vehicle underbody inspections are typically performed while the vehicle system is stationary, but the vehicle operator has an economic incentive to keep the vehicle system in transit as often as possible. Due to the restricted access and time-consuming inspection process, the equipment along the underbody of the vehicle system may not be inspected at a sufficient frequency to provide early detection of defects. Defects along the underbody equipment may become more severe over time. Without early detection and remedial action, the defects may cause significant collateral damage and/or an on-route failure of the vehicle system.

An example category of defects is fluid leaks. Fluid leaks on new vehicles may force a manufacturer to recall the vehicles. Fluid leaks on in-service vehicles may result in equipment failures, stranded vehicles, and/or environmental degradation due to the spilled fluids. An example fluid leak is oil leakage from a traction motor gear case. A traction motor gear case oil leak may lead to mechanical damage and failure of bearings, gears, axles (e.g., a locked axle condition), combo units, and/or the like. An undetected fluid leak may cause significant damage as the vehicle system travels on a route. The known practice of inspecting vehicle underbodies at regularly scheduled maintenance events may not detect leaks early enough to prevent collateral damage. It may be desirable to have a system and method that differs from those that are currently available.

BRIEF DESCRIPTION

In one or more embodiments, a defect detection system is provided that includes one or more route optical sensors disposed along a route and configured to generate image data depicting an underbody of a vehicle that is on the route. The defect detection system also includes a controller that has one or more processors and is operably connected to the one or more route optical sensors. The controller is configured to input the image data generated by the one or more route optical sensors into a first machine learning algorithm that determines an area of interest in the image data. The area of interest contains equipment of interest. The controller is configured to input the image data that is within the area of interest into a second machine learning algorithm that detects a defect on the equipment of interest. The controller is configured to perform at least one responsive action based on a type of defect that is detected.

In one or more embodiments, a method (e.g., for detecting vehicle equipment defects) is provided that includes obtaining image data depicting an underbody of a vehicle on a route. The image data is generated by one or more route optical sensors disposed along the route. The method includes inputting the image data into a first machine learning algorithm that determines an area of interest in the image data, the area of interest containing equipment of interest. The method includes inputting the image data that is within the area of interest into a second machine learning algorithm that detects a defect on the equipment of interest. The method includes performing at least one responsive action based on a type of defect that is detected.

In one or more embodiments, a defect detection system is provided that includes one or more route optical sensors disposed along a route and configured to generate image data depicting an underbody of a vehicle that is on the route. The defect detection system also includes a controller that has one or more processors and is operably connected to the one or more route optical sensors. The controller is configured to input the image data generated by the one or more route optical sensors into a first machine learning algorithm that determines an area of interest in the image data. The area of interest contains a traction motor gear case of the vehicle. The controller is configured to input the image data that is within the area of interest into a second machine learning algorithm that detects a defect on the traction motor gear case. The defect includes at least one of a fluid leak on the traction motor gear case or an absent locking element on a valve of the traction motor gear case. The second machine learning algorithm is further configured to determine a severity of the defect. The controller is configured to perform at least one responsive action based on both a type of defect that is detected and the severity of the defect.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
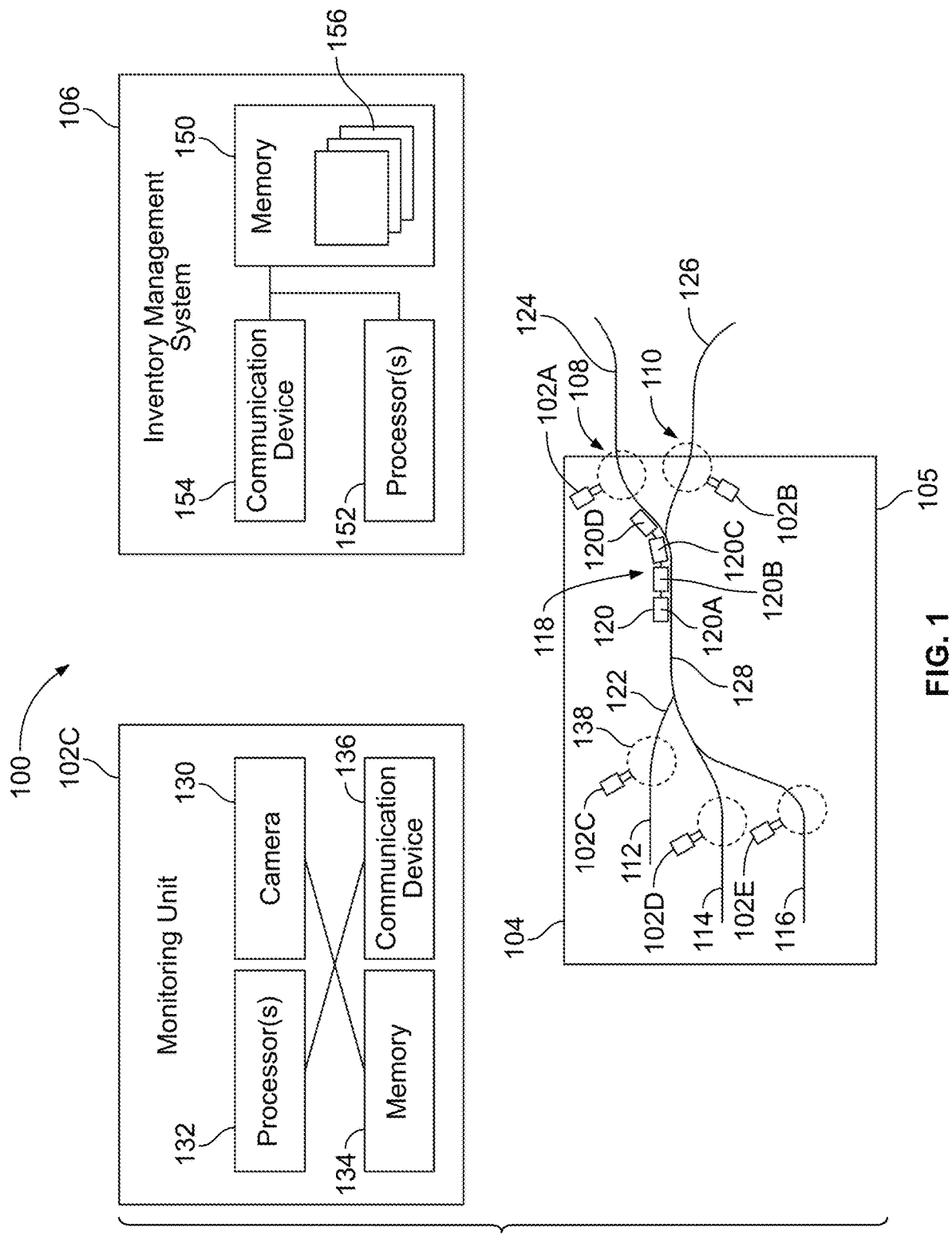
FIG. 1 a schematic diagram of a mobile asset system according to an embodiment.

One or more embodiments described herein provide an asset identification and tracking system for identifying and tracking moving objects, such as mobile assets, using computer vision and machine learning. In various embodiments, the system utilizes video analytics to detect objects moving through designated areas, classify the types of the detected moving objects, and detect and decipher identifiers on the detected moving object for identifying the locations of the particular detected objects and tracking the movement of the particular detected objects over time. The identifiers can include alphanumeric character strings and non-alphanumeric graphic features. The asset identification and tracking system is also referred to herein as a mobile asset system. The objects and/or mobile assets can include vehicles, mobile equipment, or persons.

The asset identification and tracking system includes one or more monitoring units installed at one or more designated areas. For example, the system can have multiple monitoring units that monitor different designated areas. In one embodiment, the designated areas are within a common zone or enclosure. The enclosure may have entrances, exits, maintenance areas, and different route segments within. Various vehicles may enter the enclosure, park in the enclosure for periods of time, and then exit the enclosure. Suitable monitoring units may include imaging devices, such as cameras that can obtain images in various ranges of the spectrum, such as the visible region, the infra-red region, and the ultraviolet region. The imaging device may generate image data that depicts a respective field of view of each imaging device. For example, the cameras located at the entrances capture the vehicles arriving at the enclosure, and the cameras located at the exits capture the vehicles leaving the enclosure. The asset identification and tracking system may also include an asset control system that communicates with the one or more monitoring units. Based on information received from the monitoring units, the asset control system can store and update the detected locations of multiple mobile assets in the enclosure to provide an overall snapshot of the mobile assets in the enclosure at any given time.

Using computer vision (e.g., image analysis), machine learning algorithms, and/or artificial intelligence (AI) technologies, the tracking system can analyze the image data to detect individual assets and decipher uniquely-assigned alphanumeric identifiers that are displayed on the assets. Each assigned identifier may be a character string of one or more letters and/or numbers that is associated with only one particular asset, such as a serial number or license plate. The assigned identifiers may be painted or otherwise applied on exterior surfaces of the assets. For example, the assigned identifiers may be Federal Railroad Association identifiers (FRA ID) that are mandated by regulation to be displayed on all four sides along a perimeter of a rail car. The asset identification and tracking system is configured to automatically "read" (e.g., detect and decipher/recognize the content of) the assigned identifier on each of the assets moving within the field of view of each of the cameras. The detection results may be compiled into a list of assigned identifiers. And, the order in which the assigned identifiers are determined enables the system to determine an order of the assets passing through the field of view.

In one embodiment, a detected mobile asset may not have an assigned alphanumeric identifier, the assigned identifier may be obstructed (and therefore not within the direct view of an imaging device), or the assigned identifier may be oriented away from the camera. For whatever reason, it may be desirable to track a particular mobile asset from one designated area to another without being able to read the assigned identifier. One or more graphic identifiers may be used to differentiate one mobile asset from another, to identify a particular mobile asset, and/or to track that particular mobile asset. Graphic identifiers refer to distinguishing features and/or indicia on the assets depicted in the image data. Suitable graphic identifiers may include symbols, logos, decals, placards, colors, asset types, asset shapes, asset sizes, cargo, accessories, damage (e.g., dents, scratches, etc.), discoloration, rust, graffiti, dirt, precipitation (e.g., snow, rain, etc.), occupancy details, and the like. Individually, each graphic identifier may be specific to a subset of multiple mobile assets. For example, the shape of a hopper rail car is specific to other hopper rail cars but distinguishes it from flatbed cars, locomotives, tanker cars, and the like. The occupancy may refer to features of a person or persons onboard the mobile asset, such as whether or not the asset has a driver and, if so, the driver's appearance.

When combined, multiple graphic identifiers can be used to positively identify a particular asset relative to all other assets, at least within a confidence level, without knowing the assigned identifier or any other source of identification. For example, if the system knows that a particular mobile asset is a specific type of asset and has a dent in a certain location, and a monitoring unit detects a mobile asset of the same type with a dent in that known location, the system can assign a predicted identity to that mobile asset. Naturally, a single dent (in this example) would not likely be enough for a perfect identification. However, by matching additional graphic identifiers, such as the location, the time, a logo on mobile asset, a specific type of cargo or accessory present on an asset, and the like, the probability that the identification is correct increases. Further, as more graphic identifiers are noticed by the monitoring unit, the probability can increase. Other graphic identifiers may include, in addition to the dent, a rust spot or a pattern of rust spots, scratches, discoloring, paint schemes, wear indicators, and the like. For short term, mud splatters or snow cover (especially on a roof from an aerial view) may be useful.

Although some graphic identifiers are non-alphanumeric, at least some graphic identifiers can include letters and/or numbers. For example, some character strings on assets may identify a subset of assets, such that the character string represents a type of asset, a business entity that operates the asset, or the like. Although detection and recognition of these character strings does not positively identify a single particular asset relative to all other assets (unlike an assigned identifier), such character strings may be characterized as graphic identifiers that can be used for differentiating the assets with the character strings from assets that do not have the same character strings.

In one embodiment, the mobile asset may be identified by one monitoring unit, associated with a particular designated area, and then tracked from designated area to designated area using the monitoring units to detect the one or more assigned identifiers and/or graphic identifiers. This may be enhanced by using other identification methods when such are available. For example, if an assigned identifier or a personal identifier is available then the inventive system may re-confirm the graphic identifier(s) with the particular mobile asset at that time.

The detection results from each of the monitoring units that monitor different designated areas may be communicated to the asset control system. By combining the detection results with the known locations of the monitoring units that generated the detection results, the asset control system can determine a location of each of multiple particular mobile assets. For example, the asset control system can determine whether a specific vehicle is arriving at the enclosure, located at a maintenance area in the enclosure, located along a particular route segment, or leaving the enclosure. Furthermore, the asset control system may be updated in real time or near real time based on received information from the monitoring units. For example, if a particular mobile asset was previously detected by the monitoring unit disposed at the entrance, but has since been detected by a monitoring unit disposed along a parking area, then the asset control system updates a stored or logged location of the particular mobile asset in a memory (e.g., inventory database) to indicate that the asset is located at the parking area, no longer at the entrance. Updating the locations of the assets enables continuous tracking of the assets over time. In one embodiment, the system may provide full and autonomous visibility of mobile assets within a defined area, automating the processes of mobile asset verification and inventory updating.

A technical effect of one or more embodiments of the asset identification and tracking system described herein may include improving mobile asset movement efficiency within an enclosure using computer vision algorithms for automated mobile asset identifications and inventory updates. The efficiency may be enhanced by simplifying the mobile asset system build process and inventory management procedure, instead of utilizing a fully manual process performed by human operators or costly electromagnetic sensing systems, such as installing RFID tags and readers. Another technical effect may include enhanced tracking of individual mobile assets by detecting mobile assets at a multitude of locations instead of only at entrances and/or exits. The information received from the monitoring units can be utilized to track the movements of a specific mobile asset. Such knowledge of mobile asset location within an enclosure can indicate, among other things, how close/soon a mobile asset is to exiting the enclosure. This may be useful information for a person tracking a good that is, or is being shipped within, that mobile asset.

FIG. 1 a schematic diagram of an asset identification and tracking system 100 (e.g., mobile asset system) according to an embodiment of the disclosure. The system 100 includes a plurality of monitoring units 102 installed at different locations within a zone or enclosure 104. The zone is defined by a boundary 105, which may represent a physical border, such as a fence, or an intangible border, such as a property line. The system 100 may include an asset control system 106 that is operably connected to the monitoring units. The monitoring units may be associated with different designated areas within the zone. The designated areas can be defined by functional boundaries, such as camera fields of view. The monitoring units may detect and identify the mobile assets that travel within or through the respective designated areas. The monitoring units can identify the mobile assets by analyzing image data to visually detect and decipher the assigned identifiers and graphic identifiers displayed on sides of the assets.

In the illustrated embodiment, a first monitoring unit 102A is located at an entrance 108 of the zone, a second monitoring unit 102B is located at an exit 110 of the zone, a third monitoring unit 102C is located at a first parking area 112, a fourth monitoring unit 102D is located at a second parking area 114, and a fifth monitoring unit 102E is located at a maintenance area 116. The first and second parking areas may represent different locations where individual mobile assets, which in this example are vehicles, can be assembled together to define a vehicle system for traveling together along a route to a destination. The maintenance area may represent a location of a service shop or garage for repairing and/or servicing vehicles. If a mobile asset visits a service shop or garage, then a graphic identifier association may be reset or the confidence level may be lowered. In one embodiment, the repair services are checked and if a dent is fixed then the graphic identification that relies on the dent's presence is updated accordingly.

The zone may include one or more routes 122 on which mobile assets 118 can travel. The routes include an entrance route 124 and an exit route 126 that meet at main route 128. The main route 128 branches into three different route segments within an enclosure in the illustrated embodiment. A first route segment represents the first parking area 112, a second route segment represents the second parking area 114, and a third route segment represents the maintenance area 116. FIG. 1 shows one vehicle system 118 within a vehicle enclosure which represents the zone. The vehicle system is formed from multiple individual vehicles 120. Optionally, upon entering the enclosure, the vehicles 120 of the vehicle system 118 are uncoupled and moved to different areas of the enclosure. For example, a first vehicle 120A of the vehicle system may be moved to the first parking area for assembly in a second vehicle system scheduled to leave the enclosure at a designated time to travel to a designated location. A second vehicle 120B of the vehicle system may be moved to the second parking area for assembly in a third vehicle system scheduled to leave the enclosure at a different time than the second vehicle system and/or scheduled to travel to a different destination than the second vehicle system. A third vehicle 120C of the vehicle system may be moved to the maintenance area to receive scheduled or unscheduled maintenance. A fourth vehicle 120D of the vehicle system may be moved to the first parking area and coupled to the first vehicle within the second vehicle system.

The vehicle system in the illustrated embodiment represents a vehicle platoon, swarm, and consist (collectively "consist"). Suitable vehicle consists may include a rail vehicle consist (e.g., train) having both propulsion-generating vehicles and non-propulsion-generating vehicles mechanically coupled together by couplers (and may optionally be electrically connected together). In this example, the propulsion-generating vehicles may be locomotives, and the non-propulsion-generating vehicles may be rail cars. The routes may be railroad tracks.

While one or more embodiments are described in connection with a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Suitable propulsion-generating vehicles may include respective propulsion systems that generate tractive effort for propelling the vehicle system along the route. Each propulsion system may have one or more traction motors operably coupled with different axles and/or wheels of the vehicles. The traction motors may be connected with the axles and/or wheels via one or more gears, gear sets, or other mechanical devices to transform rotary motion generated by the traction motors into rotation of the axles and/or wheels. Different traction motors may be operably connected with different axles and/or wheels such that traction motors that may be deactivated (e.g., turned OFF) do not rotate corresponding axles and/or wheels while traction motors that remain activated (e.g., turned ON) rotate corresponding axles and/or wheels. Each propulsion system may also include an energy storage system that provides electrical power to the traction motors. For example, the traction motors in a propulsion state may be powered by electric current provided to the traction motors by the energy storage system. In a regenerative braking state, the traction motors may supply electric current generated based on the rotation of the wheels and/or axles to the energy storage system for charging energy storage devices (e.g., battery cells or the like) thereof.

The monitoring units may generate image data that captures mobile assets moving through the designated areas associated with the monitoring units. The components of one monitoring unit (e.g., unit 102C) are shown in schematic block form in FIG. 1. The monitoring unit may include an imaging device 130 (referred to herein as camera), one or more processors 132, a tangible and non-transitory computer-readable storage medium (e.g., memory) 134, and a communication device 136. The monitoring unit may include additional components or different components than the components illustrated in FIG. 1. At least some of the other monitoring units can have the same types of components as the illustrated monitoring unit.

The camera is configured to generate image data within a respective field of view 138 of the camera. The camera field of view may represent or define the designated area assigned to the monitoring unit. For example, as one or more vehicles travel through the field of view 138 towards the first parking area, the camera of the monitoring unit generates image data to capture the one or more mobile assets traveling through the field of view. The camera may be suspended above the level of the route. For example, the camera may be mounted to a wayside structure, such as a pole, a fence, a box, a sign, or the like. In an example, the camera may be mounted at a height that is between about one to four meters (m) above the route level. An elevated position of the camera may enable the camera to capture more surface area of the vehicles traveling through the field of view with less obstruction and/or greater image quality than if the camera was located at route level or significantly above route level (e.g., greater than 10 m). The image data may represent video at a designated frame per second rate. Optionally, the image data may represent still images generated at a designated frequency, such as one image every second, every two seconds, every half second, or the like. The frame rate of the video or the frequency of the still images may be based on application-specific parameters, hardware capability, and/or a permitted speed along the route in the area. For example, a camera may acquire video at a greater frame rate for a route segment with a greater upper speed limit than for a route segment with a lower speed limit to ensure that each mobile asset is captured in at least one frame of the image data. The image data can then be analyzed to identify all of the mobile assets that travel through the area of the route.

The one or more processors of each monitoring unit control the functionality of the monitoring unit. The one or more processors represent hardware circuitry (e.g., one or more microprocessors, integrated circuits, microcontrollers, field programmable gate arrays, etc.) that performs operations based on one or more sets of programmed instructions (e.g., software). The programmed instructions on which the processors operate may be stored on the local memory. The memory may include one or more computer hard drives, flash drives, RAM, ROM, EEPROM, and the like. Alternatively, instructions that direct operations of the processors may be hard-wired into the logic of the control circuitry, such as by being hard-wired logic formed in programmable gate arrays (fpga), complex programmable logic devices (cpld), and/or other hardware. The processors are operably connected to the memory and/or the camera. The memory can be operably coupled to the camera, either directly or through the processors. For example, the memory may receive the image data generated by the camera, and the one or more processors may access the image data within the memory. The one or more processors may be conductively connected to the memory and the camera via electrical wires, contactors, optical cables, circuit traces, or the like.

The communication device can represent circuitry that can communicate electrical signals wirelessly and/or via wired connections. For example, the communication device can represent transceiving circuitry, one or more antennas, modems, or the like. The transceiving circuitry may include a transceiver or separate transmitter and receiver devices.

The electrical signals can form data packets that in the aggregate represent messages. In various embodiments, the one or more processors of the monitoring unit can generate messages, such as detection messages, that are communicated remotely by the communication device. The communication device can also receive messages and forward the messages to the one or more processors of the monitoring unit for analysis of the received messages.

In an embodiment, the communication device is controlled by the one or more processors to transmit detection messages to the asset control system. The detection messages may be generated by the one or more processors. The detection messages may include information determined by analyzing the image data, such as a list of various identifiers (e.g., alphanumeric and/or non-alphanumeric) deciphered from the image data, still images and/or frames generated by the camera, a time stamp at which the images were generated, a number of mobile assets detected, an order or sequence of the mobile assets detected, an identity and/or location of the monitoring unit that generated the image data, and/or the like. For example, the mobile asset identifiers in the list may be compiled in the order in which the mobile asset identifiers are detected, which corresponds to the order of the mobile assets traveling through the field of view of the camera. The first mobile asset identifier in the list may correspond to the first mobile asset of a mobile asset system that traveled through the field of view, and the second mobile asset identifier in the list corresponds to the mobile asset adjacent to the first mobile asset.

The asset control system may include a tangible and non-transitory computer-readable storage medium (e.g., memory) 150, one or more processors 152, and a communication device 154. The one or more processors control the functionality of the asset control system. The one or more processors represent hardware circuitry (e.g., one or more microprocessors, integrated circuits, microcontrollers, field programmable gate arrays, etc.) that performs operations based on one or more sets of programmed instructions (e.g., software). The programmed instructions on which the processors operate may be stored on the memory of the asset control system. In an embodiment, the memory stores an inventory database 156. The one or more processors of the asset control system may access the inventory database to retrieve and/or update the information stored therein. The updating can include replacing outdated information with information received from the monitoring units that is more accurate, current, and/or up-to-date. The inventory database may store the locations of the monitoring units, the designated areas of the enclosure monitored by the monitoring units, and the identities of the monitoring units. The inventory database also stores entries for the mobile assets that are detected by the monitoring units. A given entry for a detected mobile asset can include various information, such as the identity of the monitoring unit that detected the mobile asset, a timestamp at which the mobile asset is detected, the designated location of the monitoring unit that detected the mobile asset, an assigned identifier of the mobile asset (if deciphered), one or more graphic identifiers of the mobile asset detected from the image data, actual image data of the mobile asset generated by that monitoring unit, and/or the like. The information in the database entry may be categorized based at least on the assigned identifier associated with the particular mobile asset.

For example, the first time that a particular mobile asset is detected would presumably be upon arriving at the entrance 108. After the monitoring unit at the entrance detects the mobile asset and deciphers an assigned identifier associated with that mobile asset, such as "ABC123" for example, then the communication device of the monitoring unit communicates the detection message to the asset control system. The detection message contains the identifier (ABC123). The system may additionally or alternatively detect and decipher one or more non-alphanumeric graphic identifiers associated with the mobile asset.

The detection message may include information related to multiple different mobile assets detected by the same monitoring unit, such as in the case when an asset system of multiple assets (e.g., a train of multiple rail vehicles) travels through the designated area. The detection message may have a list that contains the information associated with each of the particular mobile assets. For example, the list has information associated with a first mobile asset that is detected, information associated with a second mobile asset that is detected immediately after the first mobile asset, and so on. The information associated with each mobile asset can include a time stamp at which that particular mobile asset is detected and any detected and deciphered identifiers, such as the assigned alphanumeric identifier and one or more graphic identifiers. The graphic identifiers can be detected by analyzing the image data using a trained neural network or the like. Optionally, at least some of the image data depicting the particular mobile asset or adjacent mobile assets may also be included in the detection message, especially for assets with unread assigned identifiers. The detection message may provide a time stamp and identify the source of the message as the monitoring unit located at the entrance (e.g., 102A in FIG. 1). The arranged list and/or the time stamps indicate the order of the mobile assets. The inventive system may associate the graphic identifiers with the particular mobile asset, and may assign a weighting, rating or probability level based at least in part on the graphic identifiers, and other factors, such as time and type. If an assigned identifier, a personal identifier, or the like is detected, then the association may be accorded a higher probability if, in the future, a mobile asset is noted by a monitoring system that has a matching set of graphic identifiers.

The asset control system receives the detection message via the communication device at the asset control system. The communication device at the asset control system can represent circuitry that can communicate electrical signals wirelessly and/or via wired connections. For example, the communication device can represent transceiving circuitry, one or more antennas, modems, or the like. The transceiving circuitry may include a transceiver or separate transmitter and receiver devices. The electrical signals can form data packets that in the aggregate represent messages. The communication device can receive messages, such as the detection messages, and forward the messages to the one or more processors at the asset control system for analysis of the received messages. The one or more processors analyze the detection message and update the inventory database with the information contained in the message. For example, the processors may create a new entry for the mobile asset identifier ABC123 and indicate in the database that the mobile asset associated with ABC123 is located at the entrance at the detected time. Alternatively, if the mobile asset has been previously detected and entered into the inventory database, the processors may update a previous entry or folder in the database to reflect that the most recent location of the mobile asset is the entrance. The processors may also store one or more graphic identifiers of the particular asset (e.g., dents, graffiti, logos, paint color, etc.) in the database to establish an association between the graphical identifiers and the particular mobile asset and any information about that asset. When the assigned identifier is readable, such that is known that the detected asset in the image data is ABC123, the graphic identifiers are associated with the assigned identifier in the database to support future identifications of the particular mobile asset even if the assigned identifier is indecipherable.

In operation, the monitoring units of the mobile asset system are configured to detect and identify the mobile assets that travel through the fields of view of the respective cameras and communicate the detected mobile asset identifiers to the asset control system. For example, the monitoring unit 102A can identify the mobile assets that enter the zone at the entrance, the monitoring unit 102B can identify the mobile assets that leave the zone at the exit, the monitoring unit 102C can identify the mobile assets that enter the first parking area, the monitoring unit 102D can identify the mobile assets that enter the second parking area, and the monitoring unit 102E can identify the mobile assets that enter the maintenance area. The asset control system updates the inventory database in response to receiving detection messages from the monitoring units that indicate updated mobile asset locations. For example, if a particular mobile asset that was previously identified at the entrance by the monitoring unit 102A is subsequently identified at the second parking area by the monitoring unit 102D, then, upon receiving a detection message from the monitoring unit 102D, the processors update the location information in the inventory database for that mobile asset to indicate that the mobile asset is located at the second parking area instead of the entrance at a particular time that the location information is updated. Therefore, based on the information received from the monitoring units, the asset control system is able to track and catalog the movements and/or locations of the mobile assets over time.

Optionally, at least one monitoring unit may be disposed at an elevated position relative to other monitoring units. Such a monitoring unit is referred to herein as an overseer monitoring unit. The overseer monitoring unit may be affixed to a tall structure, such as a pole, radio tower, tall building, or the like, or may be affixed to an unmanned aerial device that flies over the zone. The overseer monitoring unit has a larger designated survey area than the designated areas monitored by the other monitoring units disposed closer to the ground. The survey area of the overseer may overlap one or more of the designated areas monitoring by other monitoring units. In an embodiment, the image data generated by the overseer monitoring unit may be analyzed and compared with the image data generated by the other monitoring units that are located closer to the ground. The bird's eye view provided by the overseer monitoring unit can enhance the asset detection and tracking capabilities of the system.

In addition to tracking individual mobile assets, the mobile asset system may automatically generate and/or validate an asset manifest as a mobile asset system is assembled in the mobile asset zone. For example, as a new mobile asset system is assembled at the first parking area 112, the monitoring unit 102C can automatically identify the mobile assets that are moved to the route segment at the first parking area for assembly into the new mobile asset system as the mobile assets travel through the field of view of the camera. Based on the detected mobile assets and the order at which the mobile assets are detected, the monitoring unit and/or the asset control system can generate an asset manifest that lists the mobile assets identified by the monitoring unit 102C in order. The generated asset manifest can be compared with a planned trip manifest stored in a memory device, such as the memory device 134 of the monitoring unit 102C, or the memory device 150 of the asset control system. If the generated asset manifest matches the planned trip manifest, then the assembled mobile asset system is validated, indicating that the correct mobile assets are included in the mobile asset system in the correct order. If the generated mobile asset manifest does not match the planned trip manifest, such as in the specific mobile assets or the order of the mobile assets, an alert message may be generated to notify an operator of this discrepancy. The alert message may be generated by the asset control system and/or the relevant monitoring unit. By automatically generating and validating manifests as a mobile asset system is assembled, temporarily parked, and/or moved within an enclosure, the mobile asset system can reduce or obviate the need of operators to manually check each of the mobile assets in a mobile asset system prior to embarking on a trip.

In an embodiment, the asset control system communicatively connected to the monitoring units via wireless communication links. For example, the asset control system may be located at the zone or enclosure and connected to the monitoring units via RF signals. Optionally, the asset control system may be farther away from the zone and connected to the monitoring units via the Internet, satellites, and/or the like. In an alternative embodiment, the asset control system may be communicatively connected to at least some of the monitoring units via electrical or optical wires.

In one embodiment, to efficiently and quickly detect and identify the mobile assets that travel through the designated area, the monitoring units may perform image analysis and processing of the image data generated by the respective cameras. In an embodiment, the image analysis and processing may be performed by the one or more processors in a coupled edge device. The processors may apply deep learning and computer vision technology in a mobile asset identification algorithm designed to decipher the identifiers on the sides of the mobile assets. By performing the mobile asset identification algorithm at the nodes represented by the individual monitoring units, the systems that communicate with the monitoring units, such as the asset control system, can receive completed detection results without having to perform additional image analysis. The mobile asset identification algorithm according to an embodiment is described below with respect to rail mobile assets (e.g., trains), but the mobile asset identification algorithm may be utilized with suitable other types of mobile assets. Suitable other mobile assets may include a convoy of road-based trucks or off-road trucks, mining equipment, fleets of ships, individuals or groups of people, and the like.

In order to detect and decipher the assigned and graphic identifiers of a moving train, the mobile asset identification algorithm may have multiple video analysis components or subroutines, including mobile asset detection, mobile asset association between multiple image frames (e.g., tracking), identifier detection, and identifier recognition. The mobile asset detection subroutine can detect all mobile assets in the image data generated by the respective camera of the monitoring unit and can generate bounding boxes that surround the mobile assets in the image data. The mobile asset association subroutine may represent a multi-object tracking algorithm to track each individual car throughout the frames of video that depict the same car to understand the sequence of cars and identify the start-to-end frames. For example, a group of multiple interconnected mobile assets can be tracked in multiple image frames generated over time by a single camera. The mobile asset association subroutine may also designate key frames for each of the detected cars. Each key frame is a single frame selected from a sequence of multiple image frames of the image data that depict a common mobile asset (e.g., the same rail car).

The identifier detection subroutine may be applied to each of the key frames without being applied to the image frames in the sequences that are not the key frames. Therefore, the identifier detection subroutine can be performed only once for each mobile asset to limit excessive computation and processing. To further limit excessive computation and processing, the identifier detection subroutine may perform image analysis on only a subsection of the image data in each key frame. The subsection may represent the area within the bounding box that surrounds the mobile asset because the identifier is only located within the bounding box. The areas outside of the bounding box in each key frame can be ignored and/or deleted. The identifier detection subroutine may utilize a character detection model to detect any character string inside the bounding box of the car. The character string may include letters and numbers, and optionally may also include symbols. Upon detecting a character string, the image data within a bounding box surrounding the character string may be analyzed according to the identifier content recognition subroutine.

The identifier recognition subroutine may perform character content recognition for each detected character string for the purpose of deciphering an assigned alphanumeric identifier of the asset. The identifier recognition subroutine may output a determined character string as interpreted by the subroutine. The one or more processors may store the determined character strings in the local memory of the monitoring unit as assigned identifiers, and/or may communicate a list of the determined character strings (e.g., assigned identifiers) to the asset control system. The subroutine may also recognize and catalog various parameters associated with the assigned identifier in the database. For example, the color, skew (or angle), size dimension, reflectivity, brightness, and the like of the character string may be recognized and stored. Optionally, the processors may compare the assigned identifiers that are deciphered to unique identifiers stored locally in the memory in a database.

The identifier recognition subroutine may perform separate content recognition on the image data for interpreting graphic identifiers on the asset. For example, the subroutine may catalog and recognize various parameters associated with a graphic identifier, such as the color, the reflectivity, the angle, and the like. The one or more processors may store the determined graphic identifiers in the local memory of the monitoring unit and/or may communicate a list of the graphic identifiers to the asset control system. The graphic identifiers differentiate the appearance of one mobile asset from another. The identifier recognition subroutine may generate a confidence level that indicates a confidence of the processors that the determined matches are for the actual mobile asset associated with the identifiers. If the confidence level is below a certain threshold, the one or more processors may take responsive actions, as described below. In an alternative embodiment, different subroutines decipher the character strings of assigned identifiers and decipher the graphic identifiers.

Asset Detection

Figure 2:
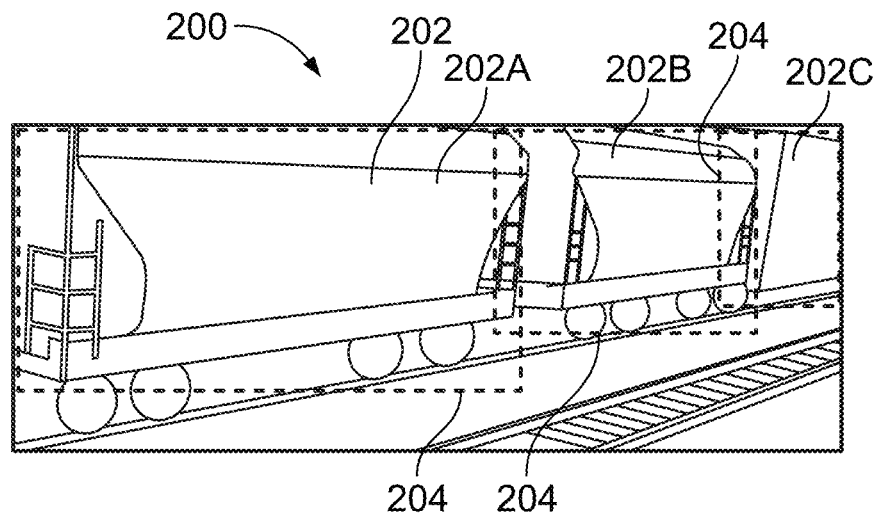
FIG. 2 is an image depicting multiple train cars surrounded by respective bounding boxes that are superimposed on the image according to an embodiment.

FIG. 2 is an image 200 depicting multiple train cars 202 surrounded by respective bounding boxes 204 that are superimposed on the image 200 according to an embodiment. The image 200 may be generated by the camera of one of the monitoring units. Optionally, the monitoring units may include a proximity sensor and/or a movement detection sensor. The proximity sensor and/or movement sensor may be operably connected to a switch that activates and/or deactivates the camera. For example, a leading car of a train may be detected by the sensors, which activates the camera to begin generating image data within the field of view of the camera. In an alternative embodiment, the camera may continuously generate image data, at least during designated active time periods, and the processors may store the image data in the memory in a loop according to a first in, first out basis.

The asset detection subroutine of the identification algorithm may be applied to the image 200 to generate the bounding boxes 204. The asset detection subroutine may provide the locations of each rail car in every image of the image data, such as every frame of a video stream. As described above, determining the locations of the cars within the images can limit the search areas for the assigned and graphic identifiers because such identifiers are only located on the cars, thereby reducing the amount of image data to analyze and process relative to analyzing and processing all of the image data in the image 200.

Figure 6:
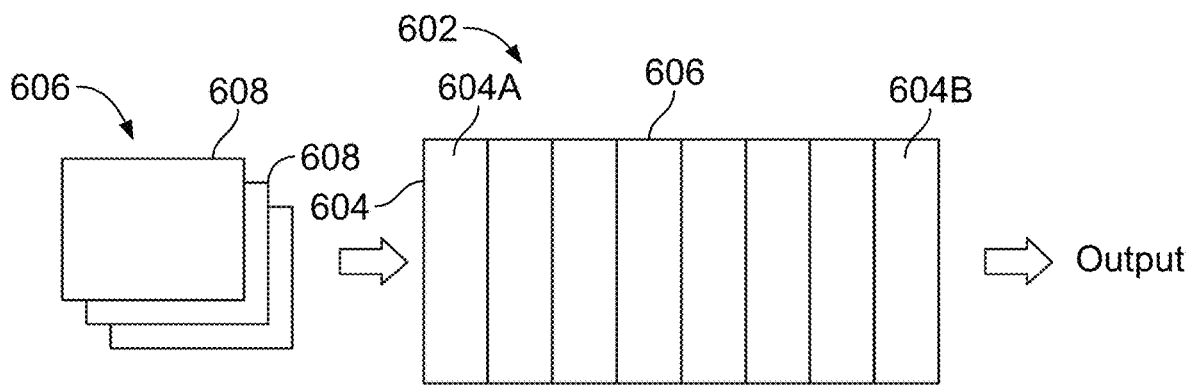
FIG. 6 illustrates a set of images poised for examination using an artificial neural network that represents a portion of an identifier detection algorithm according to an embodiment.

In an embodiment, the asset detection subroutine may be performed by a convolutional neural network deep learning model for object detection, such as the neural network 602 described in FIG. 6. The neural network may be trained to learn and identify various types of assets, such as vehicles, persons, and other mobile equipment. The neural network can be trained to learn and identify different types of rail vehicles, such as gondolas, box cars, hoppers, coal cars, center beam cars, flat bed cars, tanker cars, and the like. The neural network may be deployed to the mobile asset system to detect cars in real time. The neural network may be stored on the local memories of the monitoring units. When a train passes within the field of view of the camera of a monitoring unit, the video frames generated by the camera may be analyzed by the neural network to detect the cars in each image frame. The neural network may output bounding boxes to surround each of the detected cars in the image frames. Each detected car will be represented by a 4-points bounding box (x, y, w, h), i.e., a two-dimensional top left point coordinate (x, y), and box width and height, to indicate the car location in the frame. The size of the bounding box represents the detected size of the car in the image frame. In FIG. 2, the left-most train car 202A is the closest to the camera and has the largest bounding box compared to the sizes of the bounding boxes of the center train car 202B and right-most train car 202C in the image.

Asset Tracking Between Images

Figure 3:
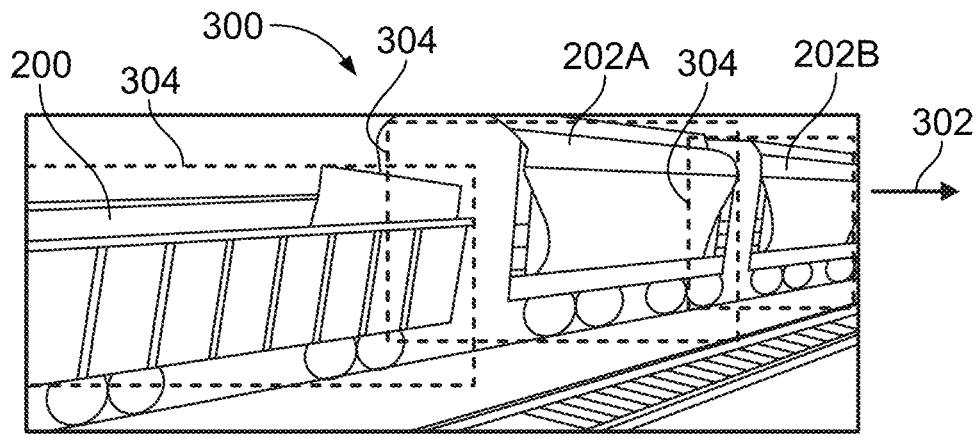
FIG. 3 shows a second image that depicts multiple train cars of the same train depicted in the image shown in FIG. 2.

The frame speed of the camera may be faster than the speed of the rail cars through the field of view of the camera, so each train car appears in multiple image frames generated by the camera. FIG. 3 shows a second image 300 that depicts multiple train cars 202 of the same train that is depicted in the image 200 shown in FIG. 2. The second image 300 may be generated subsequent to the image 200, and the train may be moving in a rightward direction 302. As a result, the hopper cars 202A, 202B are no longer the left-most and center cars in the image 300, but rather represent the center and right-most cars, respectively. The system can detect rail cars and other assets that only partially appear in a given frame of image data. In addition to detecting the assets in each image frame, it may be desirable to identify the consistency of each asset in the whole video stream. Therefore, the mobile asset system may utilize a multi-object tracking approach to track the asset movement between image frames.

In an embodiment, the field of view of the imaging device can capture a group of multiple assets moving in the scene and generate multiple images as the railcars move through the field of view. For example, the camera may generate 30 frames per second during a 10 second period of time, and each frame depicts at least a portion of three railcars. A first railcar may only be depicted in the frames generated during the first three seconds of the time period. The multi-object tracking approach of the identification algorithm can track the presence of each individual railcar through the 300 total image frames generated. For example, the identification algorithm can detect that the first railcar is present in the first 90 image frames (e.g., 30 frames per second multiplied by 3 seconds). The identification algorithm can likewise track each of the other railcars that travel through the field of view of the camera during the corresponding time period. The multi-object tracking can utilize uniquely-assigned alphanumeric identifiers and/or distinguishing appearance-based characteristics of the vehicles, such as specific features and/or indicia (e.g., damage, logo, graffiti, paint color, etc.) to track the same vehicle across multiple image frames. The multi-object tracking can be used to monitor the movement of the assets (e.g., for determining the speed of the assets), identify individual assets (e.g., for determining the order/sequence of assets), and/or count the number of assets. The assets association subroutine allows the system to know the sequence of the assets and identify the start and end frames for each asset in the image data for further analysis. As a result, the system is configured to consistently and accurately associate recognized identifiers with the corresponding individual assets. For example, colors of bounding boxes 304 surrounding the detected cars in FIG. 3 may match the colors of the bounding boxes 204 in FIG. 2 that surround the same detected cars.

Based on the ability to track objects across multiple image frames of image data generated by a single imaging device, the system can determine movement characteristics of the assets through the designated area. The movement characteristics can include a speed of the asset, a travel direction of the asset, and/or an orientation of the asset. The orientation can refer to whether the asset is facing towards the direction of movement or away from the direction of movement, otherwise referred to as traveling forward or in reverse. Such information about the movement of the asset can be included in the detection message to the asset control system. The direction of travel can be determined based on the relative position of the detected asset in the image frames over time. The speed of the asset can be determined based on a known reference distance or dimension (e.g., a known size of the asset, a known length of route in the field of view, or the like), the known frame rate of the imaging device, and the number of image frames in which the asset appears. The system may integrate depth image and/or 3D reconstruction to assist with determining the movement characteristics.

Key Frame Determination

The association subroutine may allow each asset to be distinguished and identified in a sequence of frames in the video stream. Some frames may partially capture the asset and/or or some frames may not have a good view of the assigned alphanumeric identifier on the asset due to distance of the asset from the camera, intervening objects that obscure the assigned identifier, poor quality of the assigned identifier (e.g., degraded or peeling paint), or the like. To perform the identification algorithm effectively and efficiently, the association subroutine may look to graphic identifiers to supplement the assigned identifiers. Furthermore, the subroutine may parse the images to select or designate a key frame for each asset that is depicted in the image data. The key frame is selected to provide a clear, large view of the identifier(s) on the asset, such as at a desirable size, position, scale, angle, or the like relative to the camera. The association subroutine then identifies the mobile asset with the assigned alphanumeric identifier where possible, and if not then looks to use the graphic identifiers in place thereof. In one embodiment, there is no assigned asset identifier and so only graphic identifiers are used.

The key frame may be selected based on the location and/or size of the bounding boxes associated with the same asset on different frames. In an embodiment, the key frame for a specific asset of interest may be selected by determining the image frame (in the sequence of multiple frames that depict the asset of interest) that has the largest, complete bounding box for the individual asset of interest. For example, a bounding box may only be generated if an entire side of the asset of interest is depicted in the corresponding image frame. Therefore, the key frame that is selected based on the size of the bounding box is ensured to show the entire side of the asset of interest. Referring to the images 200, 300 shown in FIGS. 2 and 3, the image 200 may be designated as the key frame for the car 202A because the bounding box 204 surrounding the car 202A is larger in the image 200 than the bounding box 304 surrounding the car 202A in the image 300. The larger bounding box indicates that the car is more proximate to the camera in the image 200 than in the image 300, so the graphic identifiers and assigned identifier on that car may be easier to detect and decipher by analyzing the image 200 instead of the image 300. By tracking the assets across multiple image frames, the association subroutine can designate a key frame for each of the assets. To increase processing speed and reduce computational effort and data storage, the identification algorithm may analyze only the key frames and may neglect and/or erase the image data of the other (e.g., non-key) frames. The designation of key frames and analysis of only the key frames may ensure that the number of image frames analyzed and the number of assigned identifiers detected matches the number of assets in the asset system that pass through the designated area monitored by the monitoring unit.

Detection of Identifier

The identifier detection subroutine of the identification algorithm is performed next to detect the identifiers on the assets depicted in the key frames. Because each of the key frames is associated with a different mobile asset of interest, and the mobile asset of interest in each key frame is surrounded by a corresponding bounding box, the key frame image data may be segmented to neglect and/or erase the image data of each key frame outside of the bounding box. In an embodiment, the identifier detection subroutine performs image analysis only on the image data within the bounding box of the asset of interest in the key frame. The image analysis is performed to detect one or more identifiers within the image data. As described above, the identifiers can include alphanumeric assigned identifiers that uniquely identify a single particular asset relative to all other assets and graphic identifiers that are distinguishing features that differentiate the particular asset from to at least some other assets. The identifiers may be displayed on a side of the mobile asset of interest.

The identifier, if an assigned identifier, may be an alphanumeric character string, such as an FRA ID that is painted, bonded, adhered, or otherwise displayed on an exterior of the asset. For example, the one or more processors may analyze the image data for characters, such as letters and numbers, which are located adjacent to one another. The image analysis may yield multiple candidate assigned identifiers because some assets may have multiple different markings that can be interpreted as letters, numbers, symbols, and/or the like. Typically, at least one of the candidate alphanumeric identifiers on a given side of the asset represents a uniquely-assigned identifier for the asset. That assigned identifier can be used by the asset control system for tracking the movement of the asset over time. It may be difficult for the system to detect assigned identifiers due to lighting and/or weather conditions, such as darkness, overcast weather, snow, rain, and the like. As a result, the monitoring system may be configured to adjust the properties of the imaging device and/or adjust the image analysis of the key frame based on the lighting and/or weather conditions. For example, the monitoring unit may change the wavelength at which the imaging device generates image data of the assets in the designated area. Furthermore, the monitoring unit may adjust settings of the image data prior to analysis, such as by enhancing the contrast, brightness, and/or the like.

The identifier, if a graphic identifier, may be a distinguishing indicia or feature on the exterior of the asset, such as a discoloration, damage (e.g., dent, rust, etc.), paint color, graffiti, decal or logo, an accessory or add-on, cargo, or other differentiating aspects. The graphic identifier may be used to substantiate the alphanumeric assigned identifier (just as the assigned identifier may be used for that purpose in reverse). Where the alphanumeric assigned identifier is not present, or is present but not visible, the system uses one or more graphic identifiers.

Prior to performing image analysis to detect the identifiers, the processors may determine one or more target areas of the key frame at which at least one of the identifiers is anticipated or expected to be present. With specific reference to the rail industry, some specific types of rail cars and/or business entities that own or operate the rail cars may display the assigned identifiers at specific areas on the rail cars. For example, a hopper car may display the assigned identifier of that hopper car at a lower left corner of an exterior side of the car, and a tanker car may display the assigned identifier of that tanker car at a top right corner of an exterior side of the car. The information linking types of assets and/or business entities with expected or anticipated locations of the assigned identifiers on the assets can be known and stored in memory, such as in a look-up table in a database, or in the hardware logic of a computing device.

In an embodiment, an artificial neural network is trained to determine or predict the types of assets depicted in the image data. The neural network may be stored in each monitoring unit. The neural network receives a given key frame of image data and predicts the type of asset in the frame. The type of asset itself is a graphic identifier of the asset and can be assigned to the detected asset in the image data. Then, based on the predicted type of asset and the predetermined association between the asset type and the identifier location, the one or more processors target one or more specific areas of the image frame that are believed to contain an assigned identifier. The one or more processors may also target one or more specific areas of the asset that are believed to contain a graphic identifier.

For example, in response to the neural network identifying a particular asset as a tanker car, the processors may access the look-up table to determine that the anticipated location of the assigned identifier is at the top right corner. Then, the processors may analyze the image data starting at the targeted top right corner in an attempt to detect the respective assigned identifier while limiting the total amount of image data that is analyzed. If the alphanumeric identifier is detected at the targeted area, then the processors decipher and catalog the identifier to positively identify the particular tanker car depicted in that image data and cease further analysis of that image frame. Targeting a specific area of the image data in which an identifier is anticipated can reduce the total amount of analysis performed relative to analyzing all of the image data within the asset bounding box. Optionally, the memory may store multiple anticipated locations of identifiers for a given asset type. If the assigned identifier is not detected in the first anticipated location, the processors may target the image data at a second anticipated location for analysis.

Optionally, instead of ceasing image analysis upon detecting the assigned identifier, the processors may analyze one or more other targeted areas of the image data to detect one or more graphic identifiers. For example, a look-up table may also include anticipated locations of graphic identifiers based on the type of asset, such as anticipated locations of rust, logos, cargo, paint schemes, dents, scratches, accessories, occupants, and the like. Any graphic identifiers that are detected can be cataloged with the detected alphanumeric identifier to establish an association between the assigned identifier and the graphic identifiers. Such associations can be utilized at a later time to positively identify the asset even if the assigned alphanumeric identifier is not visible and/or readable. For example, the detection message that is generated by a monitoring unit to the asset control system may include the deciphered assigned identifier for a given asset as well as one or more detected graphic identifiers (e.g., asset type, color, size, shape, load status, damage spots, dirt, and the like) that differentiate the given asset from at least some other assets. Although the example above describes detecting graphic identifiers after a successful detection of the assigned identifier for establishing associations between the graphic identifiers and the assigned identifier, the processors may also target the areas of the image data anticipated to contain graphic identifiers as a fallback method of identifying a given asset in response to an unsuccessful detection of the assigned alphanumeric identifier, as described herein.

An example of a graphic identifier that can be detected by targeting areas of image data is a business entity logo, trademark, or other indicia. For example, a first business entity may be known to display a company logo at a first known location on tanker cars operated by the first entity, and a second business entity displays a company logo at a different known location on tanker cars operated by the second entity. Whether or not the alphanumeric assigned identifier is successfully detected, the processors may analyze the image data at the first and second known locations. If a logo is detected at the first location in the image data, then the processors determine that the tanker car is operated by the first business entity and can assign that logo and/or business entity name as a graphic identifier associated with the depicted tanker car.

The processors may aggregate various information about each asset detected in the image data. The information can include the assigned identifier if successfully detected, the key frame image (especially if the assigned identifier is not detected), the timestamp at which the key frame image is generated, a note that the assigned identifier was not detected if that is the case, and any detected graphic identifiers. This information can be stored at least temporarily in the memory of the monitoring unit before being transmitted to the asset control system in a detection message. The graphic identifiers described above include the business entity corresponding to a detected logo and the type of asset, but the various other graphic identifiers that can be identified and assigned to the asset include paint color, size, shape, damage (scratches, dents, rust spots, etc.), cargo, accessories, occupancy, other markings, and the like. The graphic identifiers can be detected in part by targeting specific areas of the image data associated with anticipated locations of those features. A dent is more likely to appear on the lower areas, snow cover may appear on a roof, an occupant is more likely to appear in a cab of a vehicle, and so on.

In another embodiment, instead of identifying the type of asset, the artificial neural network may be trained to detect and identify other graphic identifiers on the asset depicted in the image data. For example, the neural network may be trained to detect logos, trademarks, and other markings on the assets that indicate the business entity that owns and/or operates the assets. Training a neural network to detect graphic identifiers, such as logos, dents, rust, and/or the like may be more accurate and/or efficient than performing other types of image analysis on the image data in the bounding box.

For detecting character strings in the image data that could represent the assigned identifier, the identifier detection subroutine may use object detection approaches. The detection subroutine may be able to generate an object bounding box to surround each candidate assigned identifier in the key frame. The parameters (x,y,w,h) of each object bounding box within a coordinate system can be known. Thus, the detection subroutine may provide a set of object bounding boxes that surround all candidate identifiers in the analyzes image data of the key frame. The geometrical information and other information, such as known typical locations based on asset type and/or business entity, can be used to distinguish the true assigned identifiers from other character strings on the cars (that do not uniquely identify the asset relative to all other assets).

Optionally, image rectification may be applied for some key frames to increase the likelihood of recognizing the content of the detected alphanumeric identifier. For example, if the alphanumeric assigned identifier in the image data appears a bit skewed, altering the identifier to appear square and/or horizontal may enhance the content recognition accuracy in the next step. The angle of the object bounding box may be measured, using the known coordinates of the object bounding box, to determine the skew or tilt. The image data within the object bounding box can be rectified based on the measured angle.

Identifier Content Recognition

The identifier content recognition subroutine of the identification algorithm may perform character content recognition for an assigned identifier, such as optical character recognition (OCR) on the image data. The image data depicting the assigned identifier may be defined by a bounding box, as described above. A multi-task deep artificial neural network may be used to decipher (e.g., recognize) the characters in the string. In an embodiment, the artificial neural network concurrently solve the problems of character localization and recognition.

Figure 4:
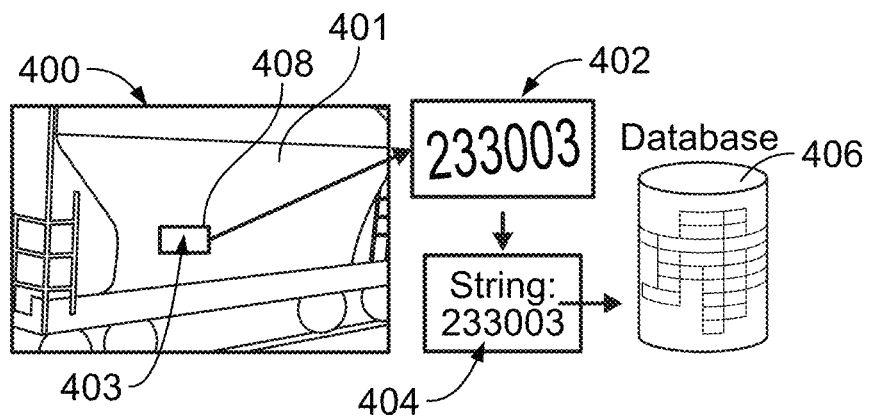
FIG. 4 is a diagram that illustrates an image showing a sub-portion of a key frame depicting a car of interest, an enlarged view of a detected assigned identifier on the car of interest, a data entry indicating a computer-deciphered content of the assigned identifier according to the identification algorithm, and a database.

FIG. 4 is a diagram that illustrates an image 400 showing a sub-portion of a key frame depicting an asset of interest 401, an enlarged view 402 of a detected assigned identifier 403 on the asset of interest, a data entry 404 indicating computer-deciphered content of the identifier according to the identification algorithm, and a database 406. With reference to the description above, once the assigned identifier is detected and bounded in a bounding box 408, the content recognition subroutine is performed to decipher the content of the identifier (e.g., to read the character string). In the illustrated embodiment, the content is determined to be "233003." The deciphered content is then stored in the database with other associated information, such as the time that the image is generated, the monitoring unit that generated the image data, and/or the location at which the image data was generated. The content number "233003" can be stored in a list within the database, which may represent the inventory database 156 shown in FIG. 1, a database within the memory 134 of the monitoring unit, or another database. Optionally, the database may include a look-up table that lists assigned identifiers, graphic identifiers, and other information about the corresponding assets. In an embodiment, the processors may compare the recognized assigned identifier (e.g., 233003) to the entries in the look-up table to access information about the specific asset associated with the identifier. For a train, the deciphered identifiers of multiple vehicles in the same train may be stored together in the database.

In an embodiment, the identifier content recognition subroutine may provide a confidence level or value with the deciphered content of the identifier. The confidence level or value may indicate a confidence level that the deciphered content of the identifier is accurate. For example, if the 233003 identifier is determined with a confidence of 95%, the identification algorithm indicates that there is an estimated 95% chance that 233003 represents the actual assigned identifier displayed on the rail car. In an embodiment, if the confidence level is at or greater than a designated threshold, such as 90%, 80%, 75%, or the like, then the deciphered content of the assigned identifier is stored in a database and/or compiled into a list of assigned identifiers. On the other hand, if the confidence level is lower than the designated threshold, then the processors are configured to mark that rail car as having an indecipherable or unrecognizable assigned identifier.

If the one or more processors are not able to recognize or decipher the content of an assigned identifier, then the processors may be configured to take one or more responsive actions. The content of an assigned identifier may be indecipherable due to poor image quality, poor display quality of the identifier on the car itself, obstruction of the identifier due to spray paint or an intervening object between the camera and the rail car, or the like. As indicated above, even if the content of an assigned identifier can be estimated, if the confidence level of the result is below a designated threshold (e.g., 80%, 75%, 70%, 65%, or the like) then the processors mark that rail car as having an indecipherable assigned identifier. The designated threshold may be selected by an operator that operates the asset identification and tracking system. In response to a rail car having an indecipherable assigned identifier, the processors may generate an alert that notifies an operator as to which car is indecipherable or "unidentified". The unidentified car may be described to the operator based on the number of the car in the sequence of the train. For example, the alert message may indicate that car "56" is unidentified. In response, a crew member may walk to that car to manually inspect the assigned identifier. In this way, manual inspection may be utilized only for the cars that are not able to be automatically identified by the processors above the confidence threshold.

The asset identification and tracking system has various automated processes for identifying assets with indecipherable assigned identifiers without requiring manual operator input or even any manual presence. For example, the matching of graphic identifiers can lead to a positive identification by narrowing the field of possible identities of an unknown asset.

The graphic identifiers are distinguishing characteristics that can help lead to a positive identification of the asset (e.g., relative to all other assets), especially when combined with information determined from other monitoring units that generate image data of the same asset. In an example in which a first monitoring unit determines that the type of an asset is a tanker car but cannot detect and/or decipher the assigned identifier, the first monitoring unit assigns the graphic identifiers to the unknown asset by communicating the graphic identifiers (and possibly also the image data) to the asset control system. A second monitoring unit at a later time may be able to successfully detect and decipher an assigned alphanumeric identifier on a tanker car leading to a positive identification of "Tanker A". The second monitoring unit also detects graphic identifiers of the Tanker A and communicates all such identifiers to the asset control system. The asset control system may be able to compare the graphic identifiers previously detected and logged by the first monitoring unit with the graphic identifiers of Tanker A detected and logged by the second monitoring unit to determine a level of match or correspondence. Depending on the degree of match and a confidence level associated with the matches (e.g., whether the matching feature are common or rare), the asset control system may be able to post hoc identify that the tanker detected by the first monitoring unit is Tanker A.

A particular mobile asset can be identified by a combination of multiple non-alphanumeric graphic identifiers that fit a determined combination threshold. The combination threshold can refer to the number of matching identifiers as well as the rarity of each match. For example, each match between a graphic identifier of a known asset and a graphic identifier of an unknown or unidentified asset can be assigned a score. The assigned scores may be higher for more unique matches. For example, a dent in an unusual location of an asset may be assigned a greater score than a type of asset and a logo on the asset. Hypothetically, the matching graphic identifiers from the first and second monitoring units may include an unusual dent, a type of asset, and a logo, and the matches may be assigned scores of 40, 25, and 15, respectively, for an aggregate score of 80. If the determined combination threshold is 70, then the aggregate match score of 80 surpasses the threshold, so the processors determine that the unidentified asset detected by the first monitoring unit is Tanker A. If the aggregate match score does not meet or exceed the threshold, then there is still no positive identification of the asset detected by the first monitoring unit.

As a result, the processors of the asset control system can update the information in the inventory database received from the first monitoring unit to indicate that the information refers to the Tanker A. For example, the asset control system may add the assigned identifier of Tanker A into the database entry that was lacking such information. Determining the identity of the asset earlier detected by the first monitoring unit provides more information of the movement of Tanker A over time. Tanker A was at the designated area monitored by the first monitoring unit and subsequently moved to the designated area monitored by the second monitoring unit. Such associations using graphic identifiers can enable positive identifications of assets even without deciphering unique assigned identification numbers, which reduces errors and improves the tracking of assets over time.

For assets that travel with other assets in an asset system, the asset identification and tracking system can utilized information from adjacent assets to identify an asset that has an indecipherable assigned identifier. For example, the one or more processors at a given monitoring unit may compile a list that includes all identifiers in order according to the order of the assets, such as the order of rail cars in a train. For example, the list can include all detected assigned identifiers and graphic identifiers associated with a first asset in a line, then all detected assigned identifiers and graphic identifiers associated with a second asset in the line, and so forth. Stated differently, the information communicated to the asset control system can indicate the order of the assets through the designated area monitored by the monitoring unit. For any unidentified assets in the line (having an undetected or indecipherable assigned identifier), the processors may be configured to make a note in the list at the designated place in the order (e.g., slot 56) that the asset is unidentified. In addition, the processors may be configured to store and/or communicate image data of the unidentified asset, without storing and/or communicating image data of at least some of the positively identified assets to limit the amount of data that is stored and/or communicated. For example, the list in the detection message can include the assigned identifiers that represent the identified assets and image data for the unidentified assets. The detection message can also include graphic identifiers for both identified and unidentified assets.

Information about the assets adjacent to an unidentified asset can represent graphic identifiers of the unidentified asset that can help identify the unidentified asset. For example, a first monitoring unit may detect that an unknown asset is the only asset between identified asset "123" and identified asset "XYZ," and such information is communicated to the asset control system. The detection message optionally may also include image data showing the adjacent assets in front and back of the unidentified asset are identifiable. If the asset control system subsequently receives a detection message from a second monitoring unit that indicates three positively identified assets "123," "ABC," and "XYZ" in that order, then the asset control system can deduce that the unknown asset from the first monitoring unit is asset "ABC". The asset control system can update the inventory database to reflect the positive identification. By making such an association, the asset control system now can track the asset "ABC" from the designated area monitored by the first monitoring unit to the designated area monitored by the second monitoring unit.

In an embodiment, the asset identification and tracking system is configured to decrease the confidence level of asset matching based on graphic identifiers over time. As time progresses, the confidence level of a positive identification may decrease based on relevancy periods of the particular graphic identifiers. For example, the relevancy period of a mud spot, snow, and a person's clothes may be a day if the mud is expected to be washed off after a shift, the snow is expected to melt, and the person is expected to change clothes daily. The relevancy period for a dent may be a few weeks if the dent is expected to be repaired after a few weeks. The probability or confidence in a given match may be based on the type of graphic identifier and the elapsed time from when the graphic identifier is assigned to the particular mobile asset to when an asset having a matching graphic identifier is detected. For example, if a first asset is detected as having a relatively unusual mud spot on a Monday morning, the system may assign a greater probability or confidence score to a matching mud spot on an asset detected on Monday afternoon then on an asset detected on Thursday because the mud may be washed off prior to Thursday. The confidence level can also adjust based on expected actions of the mobile asset. If a particular dump truck "x" is scheduled to dump a load at a given time and/or at a given dump location, then detecting a vehicle that lacks a full load prior to the scheduled dump time reduces the confidence that the detected vehicle is dump truck "x". Detecting a vehicle that lacks a full load after the scheduled dump time increases the confidence that the detected vehicle is dump truck "x". As the time advances in a given relevancy period, the confidence level decreases. For example, the confidence level regarding clothes on a person may reset on a day by day basis, but not hour by hour. The confidence level may decrease based on weather changes too, such that hats and coats may be added if the temperature drops during the day.

Because several graphic identifiers may be temporal in relevance as described above, the asset control system of the asset identification and tracking system can revise and update the list of graphic identifiers associated with known assets over time based on updated information. Referring to the example above, if the identified first asset has a mud spot, the mud spot can be stored as a graphic identifier assigned to that first asset. If the first asset is later positively identified by a monitoring unit and detected as lacking the mud spot, the lack of mud may be communicated in the detection message to the asset control system, which can delete or otherwise disassociate the mud spot graphic identifier from the first asset. Optionally, the asset control system may automatically delete graphic identifiers after the expiration of the designated relevancy period.

The asset identification and tracking system can detect persons in addition to vehicles and mobile equipment. The concepts described above can be applied in the detection and identification of people. For example, the artificial neural network may be trained to detect a person in the image data. The one or more processors may analyze the image data associated with the detected person for detecting identifiers. The person may have a unique assigned identifier that is worn by the person, such as an employee ID or a personal name on the person's shirt or jacket. If an assigned identifier of the person is not visible or decipherable, then the system can utilize graphic identifiers (e.g., differentiating features) to positively identify the person according to process of elimination. The graphic identifiers related to persons that can be detected in the image data can include a face, clothing, fashion accessory, outerwear, head gear, footwear, carrying bag, gait, or the like. Gait refers to the walking pattern as captured in multiple image frames over time. The gait can be categorized or described as a limp, jog, fast walk, slow walk, or the like. The speed of the person's movement can also be determined based on the movement of the person through the image frame over time and the known frame rate. The walking speed can represent a graphic identifier.

In an embodiment, the processors of a monitoring unit can analyze image data of a detected person to determine that the person has a colored jacket or logo associated with a particular business entity and that the person is not exhibiting a limp. The detection message can include these graphic identifiers. The asset control system can rule out various persons that do not work for the business entity and that do have a limp, thereby limiting the possible identities of the detected person. Based on the analysis, the system can detect unauthorized persons in the zone, such as a person that is not wearing a specific type or color of shirt or jacket. Upon detecting an unauthorized person, the system can generate an alert message for notifying personnel of a trespasser. The tracking of people may also be useful for safety purposes. For example, if there is an emergency in a rail yard, it may be useful to know the most recent locations of the crew members as detected by the tracking system and stored in a database.

The multiple sub-routines of the identification algorithm may be self-dependent, such that any component sub-routine may be independently operably and/or reusable with appropriate inputs. The mobile asset identification and tracking system may thus be able to automatically, and without human intervention, (i) identify the number of assets in an asset system (e.g., railcars in a train), (ii) designate a key frame associated with each asset based on how the asset appears in the camera view, (iii) crop one or more sub-portions of the image data to focus on a target area believed to depict an identifier (e.g., assigned or non-assigned), (iv) detect the identifier in the image data, and also (v) recognize the content of the identifier.

In an embodiment, the one or more processors of the mobile asset identification and tracking system may generate one or more control signals for controlling the mobile assets and/or equipment (e.g., track switches, signals, etc.) based on the information received in the detection message(s). The control signals may be signals that automatically control the mobile assets and/or equipment upon receipt of the control signals by the mobile assets and/or equipment, signals that prompt operators how to manually control the mobile assets, signals that control an electronic device to display information on the basis of which mobile assets are controlled, and/or the like. The electronic device that displays information may be a remote control device utilized to remotely control a mobile asset and/or a display device onboard a mobile asset. Based on information in received detection messages identifying the current location of various specific mobile assets, control signals may be generated for grouping and assembling assets into asset systems, such as trains, that will travel together along a route. For example, the control signals may autonomously control or prescribe movement of mobile assets from different current locations to a common route segment or parking area for staging in preparation for a trip. In another example, the one or more processors can compare the current location of a particular mobile asset to a desired location according to a schedule based on the information from the detection messages. If the particular mobile asset is not currently at the desired location, a control signal may be generated to cause the mobile asset to travel to the desired location.

The processor(s) of the asset identification and tracking system can also generate control signals to autonomously control track switches, signals, and/or other equipment to reduce the manual burden on operators and enable more efficient movement of mobile assets. For example, the processor(s) can sequentially actuate successive switches in the zone to enable a mobile asset to proceed along a prescribed path to a desired location without slowing or stopping, and the signaling can be timed to cause only minor interference, if any, on other mobile asset movements along different, intersecting paths.

Figure 5:
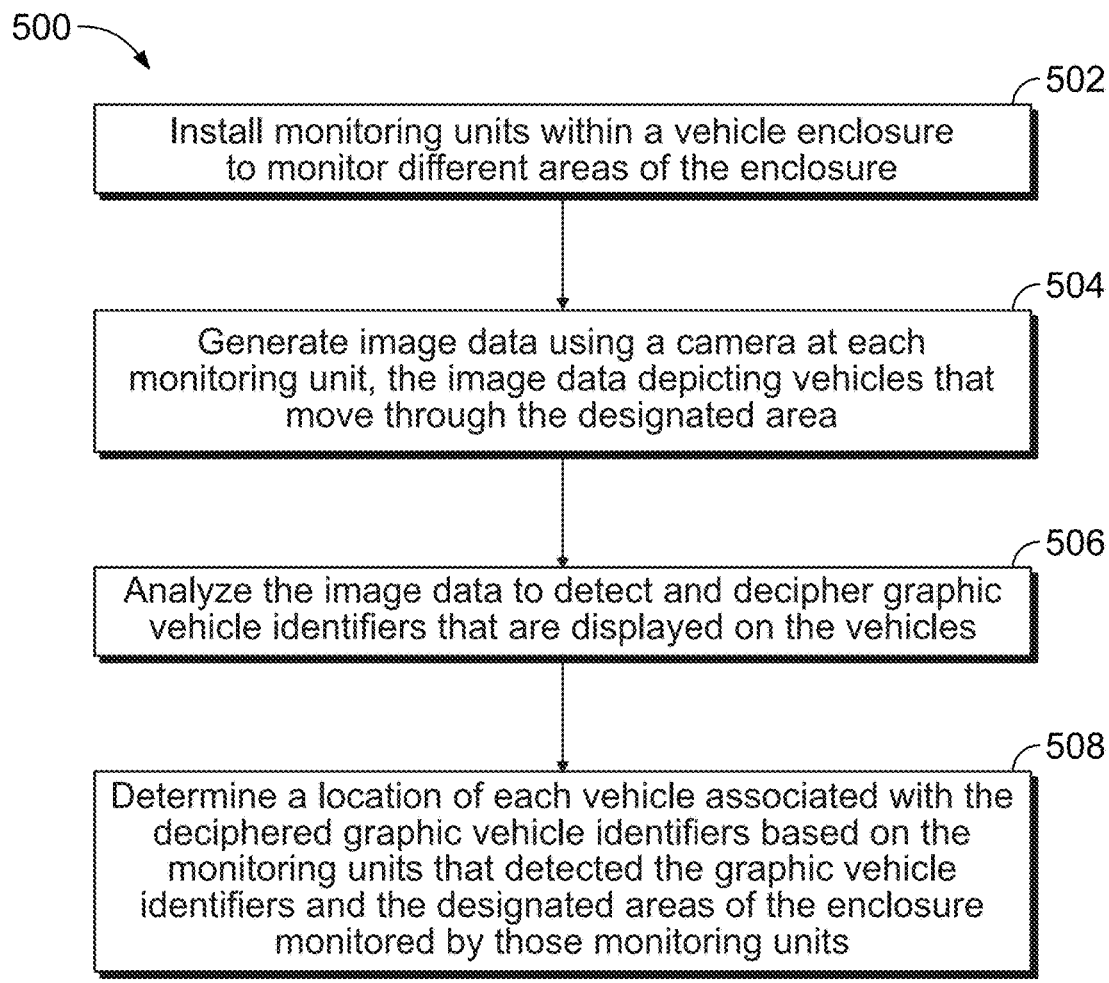
FIG. 5 is a flow chart of a method for identifying and tracking vehicles according to an embodiment.

FIG. 5 is a flow chart of a method 500 for identifying and tracking mobile assets, such as vehicles, according to an embodiment. The method may be performed by the monitoring units of the asset identification and tracking system 100 shown in FIG. 1. Optionally, the method may include additional steps, fewer steps, and/or different steps than the illustrated flow chart.

With additional reference to FIGS. 1 through 4, the method begins at 502, at which monitoring units are installed to monitor different designated areas of a zone or enclosure. At 504, image data is generated using a camera at each monitoring unit to monitor mobile assets that move through the designated areas. At 506, the image data that is generated by the camera at each monitoring unit is analyzed to detect and decipher identifiers on the assets. The identifiers can include assigned identifiers that are alphanumeric character strings. Optionally, the assigned identifiers may be FRA IDs. The identifiers also include graphic identifiers that are not assigned to uniquely identify the asset. The graphic identifiers may be non-alphanumeric (e.g., not limited to letters and numbers). For example, graphic identifiers can include differentiating features that are not present on at least some other mobile assets, such as custom paint, damage, discoloration, rust, graffiti, logos, dirt, snow, and the like. The identifiers are assigned to the particular mobile asset that is depicted in the image data. For example, the identifiers may be assigned to a particular mobile asset by establishing an association or connection between a successfully-deciphered assigned identifier of the asset, image data of the asset, and/or graphic identifiers of the asset that are detected in the image data. The association may be formed by generating a log entry in a memory and/or communicating that information in a detection message to an asset control system.

The graphic identifiers may be used to supplement the assigned identifiers for identifying the mobile asset. For example, if the alphanumeric assigned identifier is indecipherable, deciphered graphic identifiers can be used to identify the specific mobile asset relative to all other mobile assets. The deciphered identifier(s) are then compared to information in an inventory database to determine if the specific mobile asset associated with those identifier(s) is in the database. For example, if only graphic identifiers of a dent in the side of a given mobile asset and a logo indicating a brand is deciphered, image data or other information relating to the dent and the brand is compared to information in the database. If an entry in the database indicates that mobile asset #3144 has a brand and a dent that matches the graphic identifiers, then the particular mobile asset depicted in the image data can be identified (with at least some confidence depending on the pervasiveness of similar dents and of that brand) as mobile asset #3144.

At 508, a location of each mobile asset associated with deciphered identifiers is determined. The location for each mobile asset is determined based on the monitoring unit that detected and deciphered the identifier(s) associated with that mobile asset and the designated area monitored by that monitoring unit.

FIG. 6 illustrates a set 606 of images 608 poised for examination using an artificial neural network 602 that represents a portion of an identifier detection algorithm according to an embodiment. For example, the neural network may represent the neural network utilized to detect the mobile assets in the images and optionally to identify types of the mobile assets. Optionally, the neural network may represent the neural network utilized to decipher (e.g., recognize) the content of detected identifiers. The neural network may be stored within the memory 134 of each monitoring unit.

The neural network may be formed from one or more processors (e.g., microprocessors, integrated circuits, field programmable gate arrays, or the like). The neural network is divided into multiple layers 604, such as one or more input layers 604A that receive an input image, one or more output layers 604B that generate an output, and one or more intermediate layers between the input layer(s) and the output layer(s). The layers of the neural network represent different groups or sets of artificial neurons or nodes, which can represent different functions performed by the one or more processors on the input images to identify objects or features in the input images. The artificial neurons apply different weights in the functions applied to each input image to attempt to identify objects of interest in the input image.

The artificial neurons in the layers of the neural network can examine individual pixels of each image input into the neural network. The neural network may assign or associate different pixels with different object classes based on analysis of characteristics of the pixels. An object class is a type or category of an object appearing in the image. In general, a human body and an automobile can be two different object classes. More specific object classes for the mobile asset system described herein may include a hopper car as one object class, a tanker car as another object class, a background environment behind the rail cars as another object class, the number "2" as another object class, the number "3" as another object class, and the like.

Each pixel analyzed in the neural network can be labeled (e.g., associated) with a probability that the pixel represents various different object classes. For example, the artificial neuron (e.g., processors) can use linear classification to calculate classification scores for the different object classes or categories, and the classification scores indicate probabilities that a pixel represents each of various object classes. The classification score for a given pixel can be represented as a vector [a b c d], where the values of a, b, c, and d indicate the probability of the pixel representing each of different object classes. The classification score is referred to herein as a classification vector. Each artificial neuron can apply a mathematical function, such as an activation function, to the same pixel, with the functions applied by different neurons impacting the functions applied by other neurons. Different neurons may apply different weights to different terms in the functions than one or more, or all other neurons. Application of the functions generates the classification vectors for the pixels in the images, which can be used to identify different types of the vehicles, different characters in a string, or the like. The neural network may not be 100% accurate in predicting what objects are represented by different pixels, so the outputs are prediction-based.

The neurons in the layers of the neural network may determine the classification vectors for the various pixels in the images by examining characteristics of the pixels, such as the intensities, colors (e.g., wavelengths), and/or the like. The layers of artificial neurons in the neural network can examine each input images in sequential order, with the neurons of one intermediate (or hidden) layer examining a given pixel, followed by the neurons in an adjacent intermediate layer, and so on, to calculate the classification vectors of the given pixel. The results of functions applied to characteristics of a pixel by the neurons in preceding layers of the neural network influence the application of functions by the neurons in subsequent layers.

After the layers of the neural network have determined the classification vectors for the pixels, the neural network examines the classification vector of each pixel and determines the highest probability object class for each pixel. For example, a first pixel in the image having a classification vector of [0.6 0.15 0.05 0.2] indicates that the neural network calculates a 60% probability that the first pixel represents a first object class (e.g., a hopper car), a 15% probability that the first pixel represents a second object class (e.g., a tanker car), a 5% probability that the first pixel represents a third object class (e.g., background behind the train cars), and a 20% probability that the first pixel represents a fourth object class (e.g., a flatbed car). The neural network can determine that each pixel represents the object class having the greatest or largest probability in the corresponding classification vector for that pixel. For example, the neural network may determine that the first pixel described above represents a portion of a hopper car due to the 60% probability of being the hopper car object class. The selected probability may be used to convert the classification vector of the corresponding pixel to a one-hot vector. For example, the classification vector [0.6 0.15 0.05 0.2] described above would be converted to the one-hot vector [1 0 0 0], indicating that the pixel is determined to be part of a hopper car. The output is generated based on each pixel having the corresponding one-hot vector for the object class with the greater probability.

Weight values associated with each vector and neuron in the neural network constrain how the input images are related to outputs of the neurons. The weight values can be determined by the iterative flow of training data through the neural network. For example, weight values may be established during a training phase in which the neural network learns how to identify particular object classes by typical input data characteristics of the objects in training or ground truth images. For example, the neural network may be trained to detect characters, such as numbers and letters, and/or may be trained to detect vehicles, such as different types of rail cars. During the training phase, labeled training or ground truth images are input into the artificial neural network. A labeled training image is an image where all or a substantial portion of the pixels forming the image are associated with known object classes. In a labeled training image, a pixel labeled as [1 0 0 0] indicates that there is a 100% probability that the pixel represents at least a portion of an object in the first object class, and a zero percent probability that the pixel represents at least a portion of an object of any of second, third, or fourth object classes. Additional training of the neural network using labeled training images or ground truth images can improve the accuracy of the neural network at recognizing objects in images that are input into the neural network. The training modifies the weights and/or functions of the artificial neurons in the different layers, which may result in greater gaps in the probabilities for different object classes. For example, additional training may increase a probability that a pixel is within a first object class and decrease a probability that the pixel is within a second object class, increasing the confidence that the pixel is in the first object class as opposed to the second object class.

Embodiments of the subject matter described herein also relate to a system and method for detecting defects along vehicle underbodies. The defects may be present in equipment onboard the vehicle, such as traction motors, axles, wheels, gear cases, exhaust systems, cooling systems, engines, and/or the like. The defect detection system and method may use computer vision and machine learning to detect defects by imaging the underbodies (e.g., undersides) of the vehicles and analyzing the image data to search for indications of defects in the equipment. Examples of defects can include fluid leaks (e.g., oil leak, coolant leak, etc.), missing components that are expected to be present on the equipment, damaged equipment, and the like. The system and method may detect leaks in an automated and non-invasive manner, without interfering with the movement of the vehicle on its trip.

The defect detection system and method may operate to inspect vehicles while the vehicles are moving and/or stationary. For example, hardware of the defect detection system may be stationary at a wayside device along the route. The hardware may includes a route optical sensor (e.g., route camera) that is integrated with the route. The route optical sensor is oriented to have an upward-facing field of view to capture image data of the underside of a vehicle disposed over the route optical sensor. As the vehicle moves relative to the route optical sensor, the route optical sensor may capture image data depicting the underside of the vehicle. For vehicle systems that include multiple vehicles, such as trains, the route optical sensor may generate image data depicting the underside of each of the vehicles (e.g., each train car and locomotive) in sequence. The defect detection system may inspect a vehicle system while the vehicle system moves through the wayside location of the defect detection system hardware. For example, the defect detection system may inspect an entire length of a vehicle system without requiring the vehicle system to modify its speed passing by the wayside hardware of the defect detection system.

In an example, the defect detection system may be implemented at multiple different designated areas of a transportation network. For example, at least some of the monitoring units 102 shown in FIG. 1 may include at least one route optical sensor for digitally capturing the underbodies of vehicles passing by the route optical sensor(s). The defect detection process may be employed at different locations to increase the likelihood that any given vehicle is inspected during the ordinary course of travel through the transportation network.

A technical effect of one or more embodiments of the defect detection system and method described herein may include providing robust, early detection of defective conditions to permit timely intervention to correct the defective conditions, avoiding or at least limiting damage. For example, the system and method may detect fluid leaks significantly earlier than can be provided by inspecting only at scheduled maintenance events because the vehicles may travel past route optical sensors and receive automated inspections by the defect detection system more frequently than the vehicles typically receive manual inspections. Another technical effect may be a reduction in manual labor because the system is automated and does not require an operator to manually inspect the undersides of the vehicles. Another technical effect may be a reduction in repair and replacement costs by reducing the likelihood of locked axles and the extent of other collateral damage caused by an equipment defect that goes undetected for a significant period of time. The defect detection system and method may also provide increased network throughput and transportation efficiency, relative to known manual inspection processes, by reducing the risk of mid-trip vehicle failures on a route, such as stranded vehicles. For example, by reducing the risk of vehicle failures of a plurality of vehicles in a transportation network, the vehicles may experience a greater success rate at arriving on time to corresponding destinations and may be able to perform more missions or trips in a given amount of time, relative to the known manual inspection processes.

Figure 7:
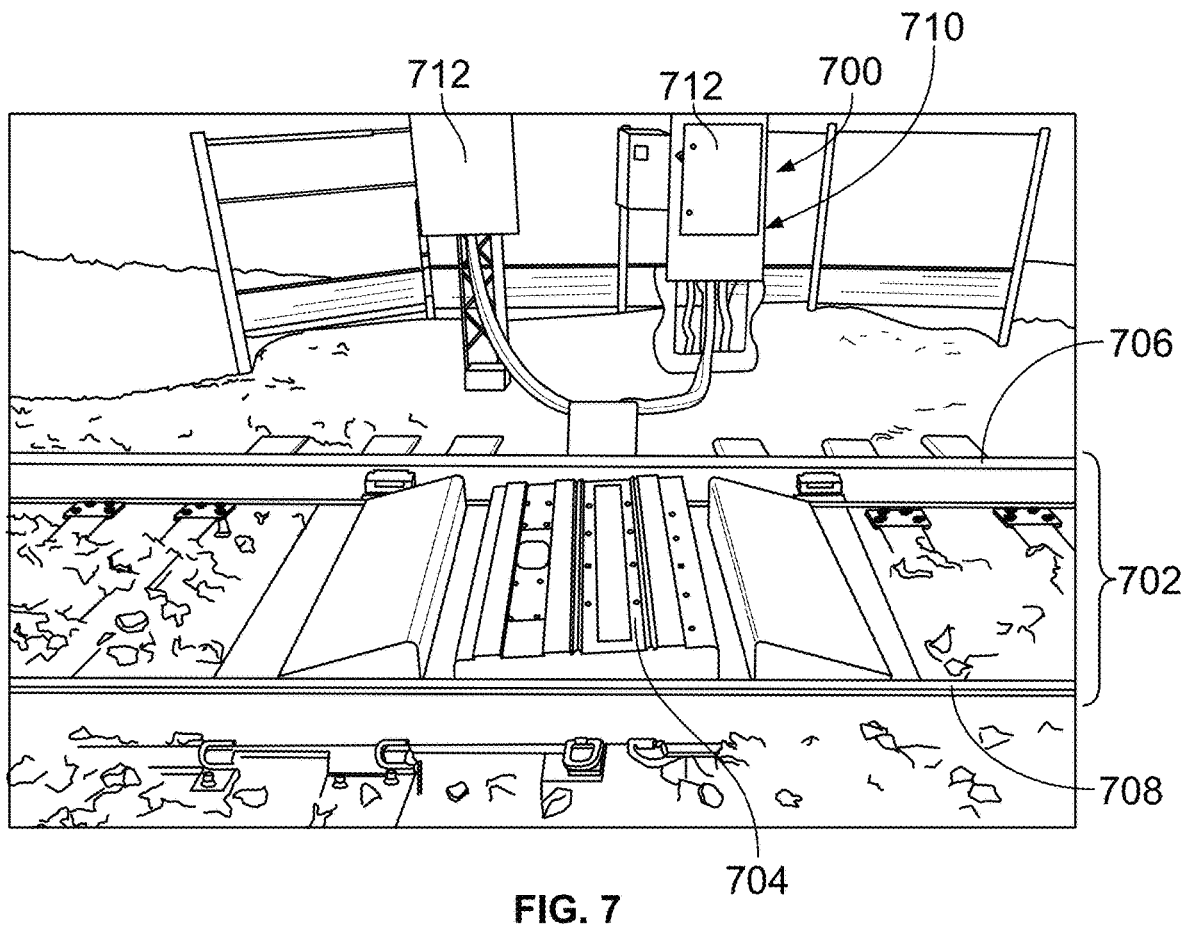
FIG. 7 illustrates a monitoring unit located along a route and associated with a defect detection system according to an embodiment.

FIG. 7 illustrates a monitoring unit 700 located along a route 702 and associated with a defect detection system according to an embodiment. The monitoring unit is a wayside apparatus. The monitoring unit may represent one of the monitoring units 100 shown in FIG. 1. In the illustrated embodiment, the route is a track for rail vehicles. The monitoring unit includes a route imaging device 704 that has one or more route optical sensors 802 (shown in FIG. 8). The route imaging device is integrated with the route. The route imaging device (and route optical sensor(s)) may be centrally positioned along a middle section of the route. For example, the route imaging device is located between a first (e.g., left) rail 706 of the track and a second (e.g., right) rail 708 of the track. The route imaging device has a low profile to enable a rail vehicle traveling on the track to pass over the imaging device without physically contacting the route imaging device. In another embodiment, the route may be a road, and the route imaging device may be approximately flush with the surface of the road. The route imaging device may be centrally positioned so the wheels of the vehicles typically pass along both sides of the route imaging device without contacting the route imaging device.

The route imaging device may be centrally located relative to a lane in the road to align with a central section of the cars and/or trucks that travel in the lane. The one or more route optical sensors are positioned and oriented with an upward field of view to capture (e.g., generate) image data depicting the underbodies of the vehicles that travel along the route and pass overhead the route imaging device. In an example, the route imaging device includes two route optical sensors. The route optical sensors may be laterally spaced apart to have at least partially different fields of view. A first route optical sensor may generate first image data corresponding to a first lateral region of the underbody of the vehicle passing overhead the route imaging device. A second route optical sensor may generate second image data corresponding to a second lateral region of the underbody of the vehicle passing overhead the route imaging device. For example, the first lateral region may be a left region, and the second lateral region may be a right region. In another example, the monitoring unit may include two discrete route imaging devices, with each having a single route optical sensor. The route imaging devices in this alternative setup could generate the same image data as the single route imaging device with two route optical sensors.

In an example, the monitoring unit 700 may include wayside infrastructure 710, such as one or more boxes 712. The one or more boxes may contain hardware and/or software for the defect detection system described herein. For example, the one or more boxes may contain at least one power source and/or power circuitry for supplying electrical power to the route imaging device. The one or more boxes may contain a controller 804 (shown in FIG. 8) that performs defect detection using image data generated by the one or more route imaging sensors of the route imaging device. In an example, the one or more boxes may contain a communication device 806 (shown in FIG. 8) that enables the controller to communicate with the vehicles traveling on the route and/or control systems that are remote from the route (e.g., the asset control system). The communication device 806 may be the communication device 136 shown in FIG. 1. The one or more boxes may contain a memory storage device that at least temporarily stores the image data generated by the route imaging device. The memory storage device may be the memory 134 shown in FIG. 1. The controller may include the one or more processors 132 shown in FIG. 1.

Figure 8:
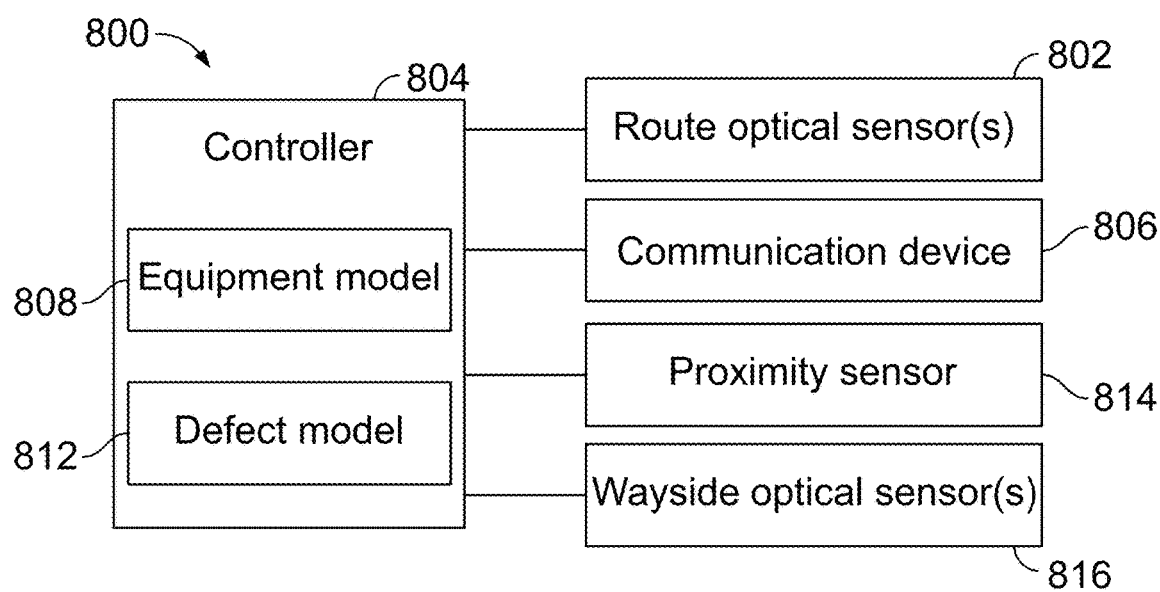
FIG. 8 is a block diagram of the defect detection system according to an embodiment.

FIG. 8 is a block diagram of a defect detection system 800 according to an embodiment. The defect detection system 800 includes the controller 804, the one or more route optical sensors 802, and the communication device 806. The controller represents hardware circuitry that includes and/or is connected with one or more processors (e.g., one or more microprocessors, integrated circuits, microcontrollers, field programmable gate arrays, etc.). The processor(s) may be the processor(s) 132 shown in FIG. 1. The controller includes and/or is connected with a tangible and non-transitory computer-readable storage medium (e.g., memory). The memory may store programmed instructions (e.g., software) that are executed by the one or more processors to perform the operations of the controller for the defect detection system and method described herein. The memory may be the memory 134 shown in FIG. 1.

The controller may include one or more machine learning algorithms. In an embodiment, the machine learning algorithm(s) include a first model 808 and a second model 810. The first model is referred to herein as an equipment model 808. The second model is referred to herein as a defect model 810. One or both of the models may be or include a neural network, a support vector machines (SVM) classifier, and/or the like. The models are used to analyze input image data and output a determination. The one or more processors of the controller may input the image data and perform one or more tasks using the output determinations of the models. The memory may include additional image analysis techniques, such as edge detection, image segmentation, and/or the like. The memory may store additional information, such as image data generated by the route optical sensor(s), a record of defects detected and vehicle identifications, and/or the like.

The one or more route optical sensors may generate image data of the surrounding environment within a field of view of the route optical sensor(s). The route optical sensor(s) may generate the image data by capturing (e.g., receiving) focused electromagnetic radiation (e.g., light) from the surrounding environment within the field of view of the respective route optical sensor. The focused light may be received on a light sensitive surface. Each route optical sensor may then convert the intensity and frequency of the electromagnetic radiation to image data, through chemical or electronic processes. The route optical sensors may generate the image data in various ranges of the spectrum, such as the visible region, the infra-red region, and the ultraviolet region. The image data may include still images and/or video. The route optical sensor(s) may be complementary metal-oxide-semiconductor (CMOS), electron-multiplying charge-coupled device (EMCCD), charge-coupled device (CCD), back-illuminated CMOS, or the like. The route optical sensor(s) may be integrated into the route as part of one or more route imaging devices, as shown in FIG. 7.

The route optical sensors may generate image data at a fast frame rate (e.g., number of images or image frames per second). The frame rate may be selected such that each route optical sensor generates a series of images depicting each individual vehicle that passes by the wayside monitoring unit on the route. For example, the route imaging device may generate image data that depicts at least a majority of the underbody of each vehicle. The depicted subject matter in the image data may include equipment such as traction motors, gear cases, engines, axles, wheels, exhaust systems, cooling systems and/or the like. The route imaging device is also referred to herein as a camera. For example, the term camera refers to a device that includes at least one optical sensor which may be any of the optical sensors described herein and may have any of the characteristics of the optical sensors described herein. The route imaging device may include a flash that illuminates the underbody of the vehicle while the route optical sensors generate the image data.

The communication device of the defect detection system represents hardware circuitry that can communicate electrical signals via wireless communication pathways and/or wired conductive pathways. The communication device may include transceiving circuitry (e.g., a transceiver or separate transmitter and receiver), one or more antennas, and the like, for wireless communication. For example, the controller may control the communication device to transmit or broadcast messages to the vehicles that travel along the route and are imaged by the route optical sensor(s). In another example, the controller may control the communication device to communicate with a remote control system (e.g., dispatch facility), a maintenance shop, and/or the like.

The defect detection system may include one or more additional sensors. For example, the defect detection system may have a proximity sensor 814 that is operably connected to the controller. The proximity sensor 814 may be used by the controller to determine when a vehicle is approaching the defect detection system (e.g., the wayside monitoring unit shown in FIG. 7). The controller may receive and analyze sensor signals generated by the proximity sensor 814. The sensor signals may indicate whether or not any vehicle or other object is within a threshold proximity of the proximity sensor 814. In response to determining that a vehicle or other object is within the threshold proximity, the controller may generate a control signal to activate the route optical sensor(s) to being generating (e.g., capturing) image data. The control signal may be conveyed to the route imaging device via a wired conductive pathway and/or wirelessly via a transmitter of the communication device. The controller may use the proximity sensor as a trigger mechanism to determine when to begin generating image data, thereby conserving energy and memory by only generating image data while one or more vehicles are near the wayside monitoring unit.

In an example, the defect detection system may also include one or more wayside optical sensors 816. The wayside optical sensor(s) 816 may be components of one or more imaging devices (e.g., cameras) that are suspended above the route and are oriented to have a field of view that encompasses at least a portion of the vehicles that travel on the route as the vehicles pass by the imaging devices. The wayside optical sensor(s) may generate image data that is used by the controller to identify the vehicles based on detecting and deciphering indicia displayed along the exterior surfaces of the vehicles. For example, the wayside optical sensor(s) may be components of the camera 130 (shown in FIG. 1). The indicia displayed along the exterior surfaces of the vehicles may include unique identifiers (e.g., FRA IDs on locomotives), non-alphanumeric graphic identifiers, and/or the like. The controller of the defect detection system may receive and analyze image data generated by the wayside optical sensor(s) to identify the vehicles traveling past the wayside monitoring unit, according to the asset identification system and method described herein.

By identifying the vehicles, the controller can associate the status of underbody defects with specific vehicles. For example, a given train may include 100 vehicles. The controller of the defect detection system may analyze image data depicting all 100 vehicles, and may determine that three of the inspected vehicles have equipment defects along the underbody to address. Identifying the vehicles of the train based on the image data generated by the wayside optical sensor(s) permits the controller to tag the defect information to only the three specific vehicles of the train that have the detected defects. The controller may indicate in a recorded database or status message that the other 97 vehicles have passed the underbody inspection. As a result, the operator of the train is able to pinpoint the three specific vehicles for maintenance, and may pull those three vehicles from the train at the next available opportunity.

Figure 9:
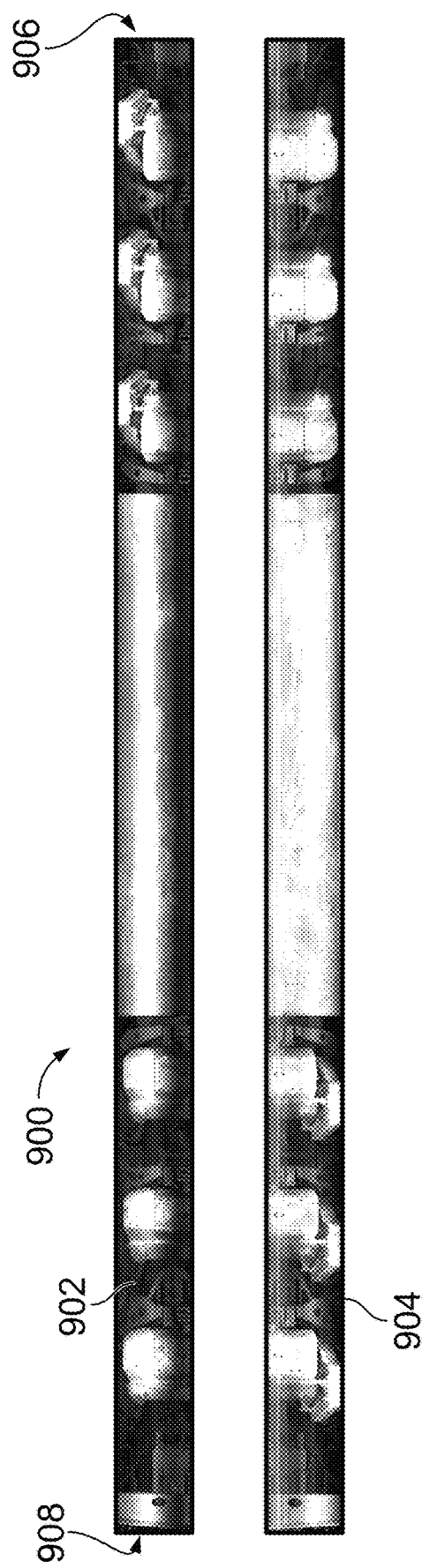
FIG. 9 illustrates a full line scan image of image data generated by route optical sensors of the defect detection system according to an embodiment.

FIG. 9 illustrates a full line scan image 900 of image data generated by the route optical sensors of the defect detection system according to an embodiment. The full line scan image includes a first strip 902 and a second strip 904. The image data in the full line scan image depicts the underbody (e.g., underside) of a vehicle passing overhead the route optical sensors. The first strip may be image data generated by the first route optical sensor, and the second strip may be image data generated by the second route optical sensor. For example, the first strip may depict a first (e.g., left) lateral region of the vehicle passing overhead the route imaging device integrated with the route. The second strip may depict a second (e.g., right) lateral region of the vehicle passing overhead the route imaging device. The full line scan image may depict an entire or at least a majority of the length of the vehicle. For example, a first end 906 of the full line scan image may be associated with a front end of the vehicle (according to a direction of travel), and a second end 908 of the full line scan image may be associated with a rear or back end of the vehicle. In an example, the route optical sensors may be controlled to generate rapid (e.g., high speed) images of the underbody, and the images may be compiled to produce the strips shown in FIG. 9. For example, the route optical sensors may be high-speed optical sensors that capture and record a series of line-sized images to electronic memory.

Figure 10:
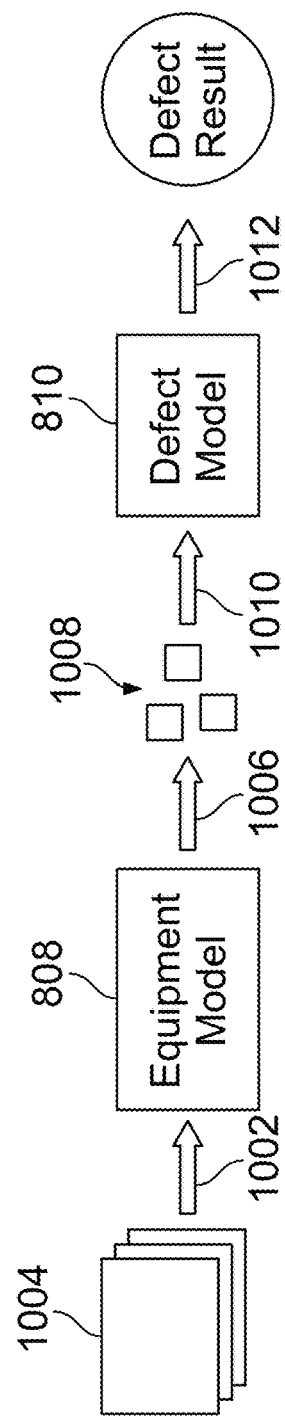
FIG. 10 is a schematic diagram showing workflow operations of the defect detection system according to an embodiment.

FIG. 10 is a schematic diagram showing workflow operations of the defect detection system according to an embodiment. The schematic diagram is used to describe how the defect detection system analyzes the image data generated by the route optical sensors to determine areas of interest in the image data. The operations of the defect detection system shown in the illustrated diagram may be performed by the controller except where indicated. At step 1002, the controller may input image data 1004 into the equipment model 808. The input image data may include the strips of the full line scan image shown in FIG. 9.

The equipment model may be designed to detect one or more specific types of equipment (e.g., equipment of interest) along the underbody of the vehicles. The equipment model may be designed to detect the specific types of equipment by training the equipment model using labeled images or the like. In an example, the equipment model may be designed to detect traction motor gear cases. There are six traction motor gear cases in the full line scan image shown in FIG. 9. The equipment model may operate using historical data and/or computer vision methods, such as image classification and object detection. Different vehicles have different types, numbers, and locations of equipment along the underbody. For example, some locomotives have four traction motor gear cases, and other locomotives have six traction motor gear cases. Furthermore, two 4-traction motor locomotives produced by different manufacturers may position the traction motors and associated gear cases in different locations along the underbody of the respective locomotives. The equipment model may be designed to detect different types of traction motor gear cases in the input image data, regardless of the number and location of the traction motor gear cases.

In another example, the equipment model may be designed to detect traction motors in the image data as the equipment of interest. Some locomotives may include alternating current (AC) traction motors, and other locomotives may include direct current (DC) traction motors. The AC traction motors may appear differently than the DC traction motors. The equipment model may be designed to detect both AC traction motors and DC traction motors in the image data. Other examples of equipment of interest can include engines, cooling systems, exhaust systems, transmissions, wheels, axles, and/or the like. Optionally, the equipment model may be designed to detect multiple types of equipment of interest. For example, the equipment model may be designed (e.g., trained) to detect all gear cases, axles, and wheels that are depicted in the input image data.

Figure 11:
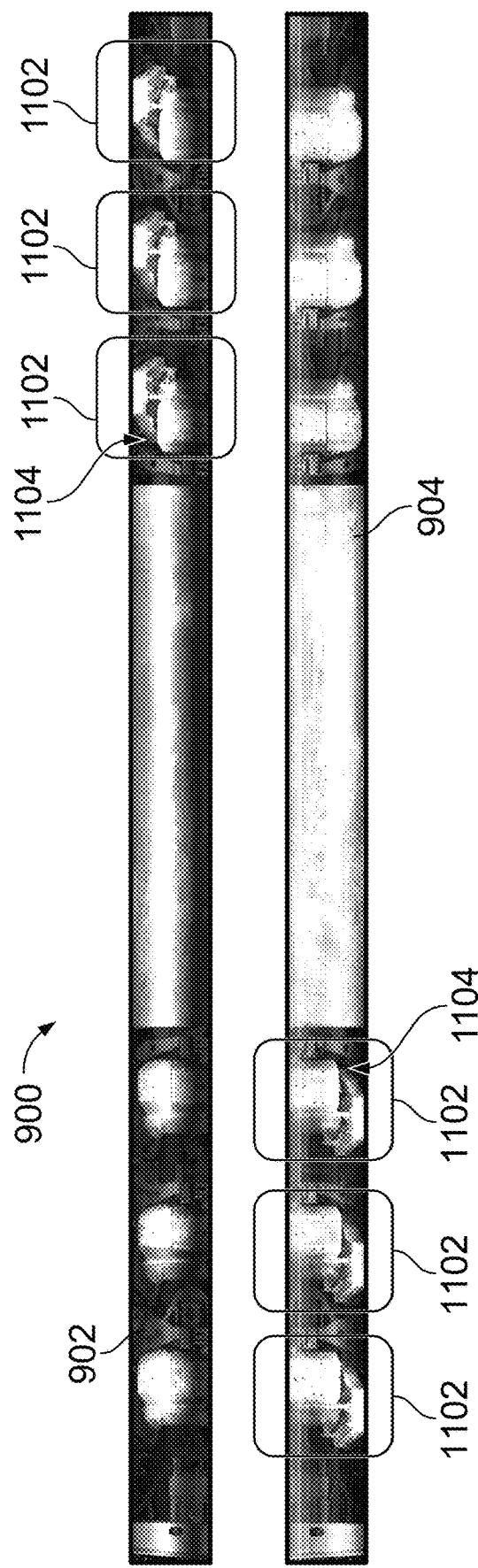
FIG. 11 shows a modified version of the full line scan image of FIG. 9 with bounding boxes superimposed on the full line scan image.

The equipment model may determine areas of interest in the input image data that contain the equipment of interest that is detected. FIG. 11 shows a modified version of the full line scan image 900 of FIG. 9 with bounding boxes 1102 superimposed on the full line scan image. The bounding boxes indicate areas of interest 1104 determined by the equipment model. In the illustrated example, the equipment model determines three areas of interest on each of the first and second strips 902, 904. The areas of interest may contain depicted traction motor gear cases, which represent the equipment of interest in an example embodiment. In an example, the equipment model may generate the bounding boxes to surround each of the detected traction motor gear cases. The coordinates of the bounding boxes in the image data may be communicated to the controller and/or the memory.

Referring now back to FIG. 10, at step 1006 the equipment model and/or the controller may crop the image data to isolate the areas of interest as determined by the equipment model. In an example, the equipment model may crop the image data and may output cropped image data 1008 depicting the areas of interest. The cropped image data may exclude the image data outside of the areas of interest (e.g., outside of the bounding boxes shown in FIG. 11). In another example, the equipment model may output the coordinates of the areas of interest (without cropping the image data). The controller may receive the coordinates that are output and may crop the image data to provide the cropped image data.

In an example, after detecting equipment of interest, the equipment model may classify the input image data as relating to different categories of vehicles. For example, the equipment model may classify a first subset of the input image data as depicting a 6-axle locomotive and may classify a second subset of the input image data as depicting a 4-axle locomotive. The equipment model may determine the category of vehicle based on the number, type, and/or positioning of the equipment of interest along the underbody. For example, a 6-axle locomotive may have six traction motor gear cases, and a 4-axle locomotive may have four traction motor gear cases. The equipment model may classify the image data as depicting a 6-axle locomotive in response to detecting six traction motor gear cases in the input image data. In an example, the controller may segregate the cropped image data from at least some different categories of vehicles. For example, the controller may store the cropped image data from 6-axle locomotives in a first group, and may store the cropped image data from 4-axle locomotives in a second group. The controller may use a different model or image analysis algorithm to analyze the cropped image data of 6-axle locomotives versus the cropped image data of 4-axle locomotives. The 6- and 4-axle locomotives represent one example of different vehicle categories that may be identified by the equipment model. In other examples, the equipment model may be able to classify the image data as relating to different types of road vehicles (e.g., semi-trucks versus personal cars and trucks), different manufacturers of the same type of vehicle, different models produced by the same manufacturer, and/or the like. For example, the equipment model and/or controller may sort the cropped images into two different manufacturer categories based on the type, number, and/or location of the equipment of interest in the input image data. In another example, the equipment model and/or controller may segregate the cropped images depicting locomotives with AC traction motors from the cropped images depicting locomotives with DC traction motors.

At step 1010, the cropped image data depicting the areas of interest is input to the defect model 810. The defect model may analyze the cropped image data to detect defects in the equipment. The defect model may analyze the cropped image data to classify whether the image data contains a fluid leak, as one example defect. The defect model may be trained via samples of images depicting healthy equipment and samples of images depicting defective equipment. The defective equipment may have fluid leaks, may be missing one or more physical parts or components of the equipment, and/or may have visible damage. One example of a missing part is a missing valve locking element on a valve. Without the valve locking element, the valve may be prone to leakage. Examples of visible damage may include scrapes, broken parts, rust, discoloration, accumulation of extraneous material on the equipment, and/or the like.

In an example, the defect detection system may have different defect models for analyzing different categories or classes of equipment and/or vehicles. For example, the controller may input the cropped image data depicting the AC traction motors to a first defect model, and may input the cropped image data depicting DC traction motors to a second defect model. The first defect model may be designed (e.g., trained) to classify defects in AC traction motors, and the second defect model may be designed to classify defects in DC traction motors. In another example, a first defect model may be designed to classify defects in equipment onboard vehicles produced by a first manufacturer, and a second defect model may be designed to classify defects in equipment onboard vehicles produced by a second manufacturer. In one example, the controller may determine the category to which cropped image data applies based on the output of the equipment model. As described above, the equipment model may classify the input image data as associated with different categories based on the analysis of the image data, including the number, type, and position of the equipment of interest. In another example, the controller may determine the category based on an identification of the vehicle. For example, the controller may identify the vehicle based on image data generated by the wayside optical sensor(s) 816, such as image data depicting a unique alphanumeric identifier assigned to the vehicle. After identifying the vehicle, the controller may look up a category for the vehicle in a look-up table or database. The controller may select the specific defect model to use for analyzing the cropped image data based on the information in the look-up table or database. For example, the look-up table may indicate that Vehicle 1245 has AC traction motors, so the controller may select the defect model that is trained to detect defects in AC traction motors and/or AC traction motor gear cases.

In an example, the defect model 810 in FIG. 10 may be designed to detect different types of defects. For example, the defect model may analyze a given cropped image and determine whether or not the depicted equipment has a fluid leak, is missing any parts that are expected to be present in the field of view, and/or has any damage that is more severe than expected wear and tear. In another example, the defect detection system may have different defect models designed to detect different types of defects. For example, the defect model in FIG. 10 may be a first defect model designed to detect fluid leaks. The fluid leaks may include oil leaks, coolant leaks, brake fluid leaks, and/or the like. The first defect model may receive the cropped image data to determine whether the vehicle has any fluid leaks. In addition to inputting the cropped image data to the first defect model, the controller may input the cropped image data to a second defect model that is designed to detect missing parts and/or damage.

Figure 12:
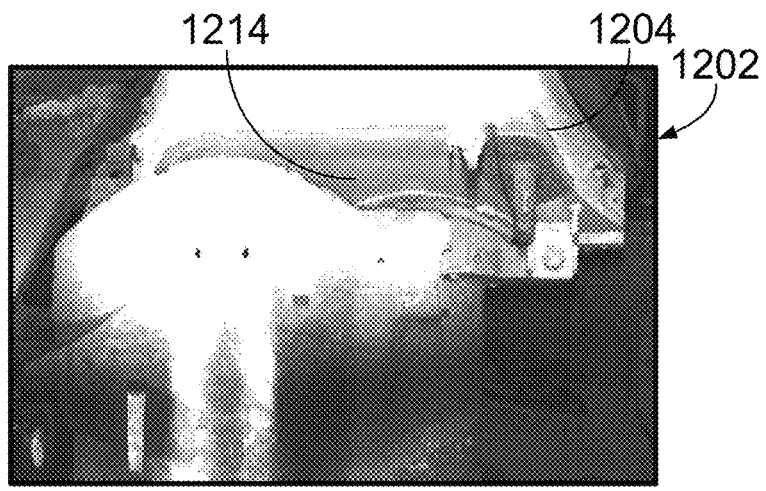
FIG. 12 is a first cropped image depicting a first traction motor gear case.
Figure 13:
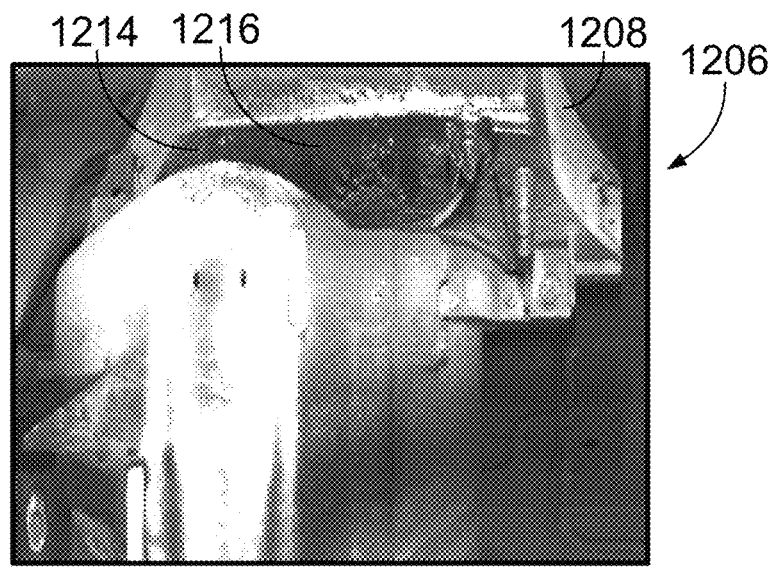
FIG. 13 is a second cropped image depicting a second traction motor gear case.
Figure 14:
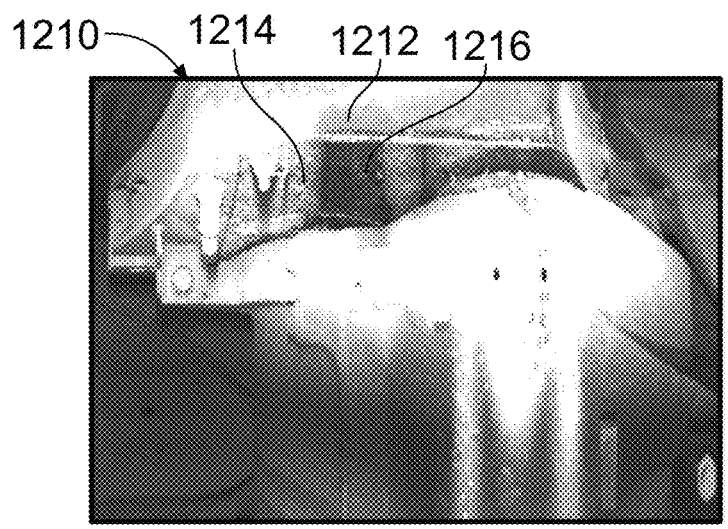
FIG. 14 is a third cropped image depicting a third traction motor gear case.

FIGS. 12 through 14 show three cropped images depicting three areas of interest. The areas of interest contain traction motor gear cases, which represent the equipment of interest. FIG. 12 is a first cropped image 1202 depicting a first traction motor gear case 1204. FIG. 13 is a second cropped image 1206 depicting a second traction motor gear case 1208. FIG. 14 is a third cropped image 1210 depicting a third traction motor gear case 1212. The cropped images in FIGS. 12 through 14 may be examples of the cropped image data 1008 output by the equipment model and/or the controller at step 1006 of the workflow shown in FIG. 10. The controller may input these three cropped images to the defect model at step 1010 shown in FIG. 10. The defect model may analyze the cropped images and output a defect result at step 1012. The defect result may indicate whether any of the cropped images show evidence of defects present on the equipment.

In an example, the defect model may determine that the first traction motor gear case shown in FIG. 12 is healthy. The defect model may classify the equipment of interest as healthy if the equipment does not appear to have any defects of sufficient severity to warrant a responsive action. In an example, the defect model is designed to detect fluid leaks, and the defect model determines that the first traction motor gear case does not have a fluid leak. For example, the defect model may determine that the bottom surface 1214 of the first traction motor gear case is devoid of oil or another vehicle fluid. The defect model may analyze the color characteristics (e.g., wavelength, intensity, etc.) of the pixels to detect fluid leaks. For example, the bottom surface as depicted in the first cropped image may have a color that is relatively uniform across the surface area of the bottom surface and is within an expected wavelength range. The expected wavelength range may encompass the color of the bottom surface of the gear case as installed. For example, the bottom surface may have a metallic gray color which has a wavelength within the expected wavelength range. Furthermore, the intensity of the electromagnetic waves reflected off the bottom surface may be within a designated intensity range indicative of a dry surface (e.g., no leak). For example, the intensity of the pixels that depict the bottom surface of the gear case may be relatively high or bright, indicating that the bottom surface is free of oil and other vehicle fluids. With respect to the first cropped image, the defect model does not detect any portion of the bottom surface or any other surface on the gear case that shows evidence of a fluid leak. The defect result generated by the defect model may indicate that the first traction motor gear case is free of visible defects.

Upon analyzing the second and third cropped images shown in FIGS. 13 and 14, the defect model may determine that the second and third traction motor gear cases both have defects in the form of fluid leaks. The defect model may determine that the fluid leaks are oil leaks. For example, in FIG. 13, the bottom surface 1214 of the second traction motor gear case is covered by a significant amount of oil. The oil may have a different color than the bottom surface of the gear case (when dry). For example, the areas of the gear case that are covered by leaked oil may appear darker than areas of the gear case that are dry (e.g., not covered by oil). More specifically, the pixels that depict the leaked oil on the gear cases may have a reduced intensity and/or wavelengths within a different wavelength range relative to pixels that depict dry areas of the bottom surface of the gear case.

In an example, the defect model may be trained to determine that the second and third cropped images show fluid leaks and the first cropped image is free of fluid leaks without measuring characteristics of the pixels and comparing the characteristics to data in a look-up table or the like. For example, the defect model may be trained to detect the dark areas along the bottom surfaces of the gear cases in the second and third cropped images and to associate the dark areas with fluid leaks. More specifically, the defect model may determine that the fluid leaks are oil leaks due to the detected leaks being located on the bottom surfaces of traction motor gear cases. For example, the defect model may determine, based on training or the like, that any leaks along the bottom surfaces of traction motor gear cases are oil leaks because the gear cases contain oil. The defect result generated by the defect model may indicate that the second and third traction motor gear cases have defects in the form of oil leaks. In another example, if the defect model detects a fluid leak along a surface of a cooling system that contains a coolant, the defect model may determine that the fluid leak is a coolant leak.

The controller of the defect detection system may execute one or more responsive actions upon receiving the defect result from the defect model. The responsive actions that are taken may be based on the presence of defects detected, the type of the defects, and/or the severity of the defects. In one example, upon detecting a defect along the underbody of a vehicle, the controller may control the communication device to communicate a notification message to a remote control device, such as a dispatch facility. The notification message may provide information about the detected defect along the underbody of the vehicle. For example, the notification message may provide a description of the defect. For the traction motor gear cases shown in FIGS. 13 and 14, the controller may generate the notification message to provide that the traction motor gear cases have oil leaks.

In an example, the notification message may also identify the equipment that has the detected defect. In the illustrated example, the notification message would identify the equipment as traction motor gear cases. The controller optionally may identify the specific traction motor gear cases that have the defects, to avoid any confusion with respect to vehicles that have several pieces of similar equipment. In an example, the equipment model and/or the controller at step 1006 or step 1010 of the workflow in FIG. 10 may tag the cropped image data with an identifier that uniquely identifies the traction motor gear cases relative to each other. For example, upon determining the areas of interest from the image data, as shown in FIG. 11, the equipment model and/or controller may tag the image data of each area of interest with an identification tag. Example identification tags may associate the traction motor gear cases with corresponding axles of the vehicle, numbered from front to back. For example, the cropped image shown in FIG. 13 may be tagged to indicate that the image depicts the traction motor gear case associated with the fourth axle of the vehicle, and the cropped image shown in FIG. 14 may be tagged to indicate that the image depicts the traction motor gear case associated with the sixth axle of the vehicle. Upon receiving the notification message, the remote control system may schedule maintenance for the vehicle, change a trip schedule of the vehicle, pull the vehicle from service, and/or generate a record of the detected defect for digital data storage.

In an example, the controller may determine an identity of the vehicle that includes the one or more defects. For example, the controller may identify the vehicle based on indicia displayed along the exterior surface of the vehicle, as described above with respect to FIGS. 1 through 6. More specifically, the controller may receive and analyze image data generated by the one or more wayside optical sensors 816 shown in FIG. 8 to uniquely identify the vehicle relative to other vehicles that travel on the route past the wayside monitoring unit. The controller may generate the notification message to also include the vehicle identity. For example, the controller may generate the notification message to include the vehicle identity, a description of each defect, a description and/or identity of the equipment on which each defect is detected, a location of the wayside monitoring unit that detected the defect(s), a time at which the defect(s) were detected, and/or an identity of the route on which the vehicle is traveling.

In another example, the controller may control the communication device to communicate the notification message to the vehicle itself, such as to notify an operator onboard the vehicle and/or an automated vehicle control system onboard the vehicle about the defect(s) that are detected, or lack thereof. In one example, upon inspecting the underbody of the vehicle traveling past the wayside monitoring unit, the controller may control the communication device to broadcast the notification message. The vehicle may receive the broadcasted notification message while the vehicle is still in range of the communication device. Based on the received notification message, the operator and/or vehicle control system may decide to modify movement of the vehicle, may reallocate loads among the equipment, may deviate from a planned route to pull over and/or drive to a maintenance facility, and/or the like. In another example, upon identifying the vehicle, the controller may control the communication device to establish a communication link with the vehicle. The controller may then control the communication device to transmit the notification message to the vehicle via the communication link. As opposed to broadcasting the notification message, the communication link may ensure that the notification message is only received by the intended vehicle.

In another example, upon detecting one or more defects along the underbody of the vehicle, the controller may automatically schedule maintenance for the vehicle. The maintenance may be scheduled for a time that is sooner than a periodic maintenance event. The maintenance may be scheduled to address the detected defects. Another responsive action of the controller may be to generate a record of the detected defect(s) for digital data storage in a database. For example, the controller may upload information about any defects that are detected to a database that tracks the performance and service history of the vehicle. The database optionally may be stored locally in the memory associated with the controller and/or may be remotely located at a server or other computer device.

In an example, the controller may recommend and/or automatically implement one or more operations of the vehicle in response to detecting one or more defects along the underside of the vehicle. The controller may determine the vehicle operations to take based on the type, number, and severity of the defects. For example, upon detecting an oil leak on a traction motor gear case associated with the fourth axle of a locomotive, the controller may determine that the vehicle should disable the traction motor associated with the fourth axle and should distribute the load assigned to that traction motor to other traction motors of the vehicle. In another example, the controller may determine that the vehicle should reduce the duty cycle of the traction motor associated with the fourth axle and should increase the duty cycle assigned to one or more of the other traction motors to compensate. Disabling and/or reducing the duty cycle of the defective traction motor may reduce the likelihood and/or extent of damage attributable to the oil leak. The recommended control operations may be communicated to the vehicle in a message. For example, the controller may generate the notification message to include suggested control operations (e.g., pull the vehicle over, move to a maintenance facility, disable the equipment that is defective, reduce the duty cycle of the defective equipment) that are presented to the operator onboard the vehicle as a recommendation. In another example, the controller may generate control signals that are communicated to the vehicle. The control signals may be generated for automatically controlling the vehicle control device to take the suggested control operation. For example, upon receiving the control signals from the wayside monitoring unit, the vehicle control system onboard the vehicle may automatically implement the suggested control operations without requiring operator approval.

In an embodiment, the defect model may be designed to determine additional details about a detected defect beyond a binary determination of whether or not a defect is present on the equipment in the area of interest. For example, the defect model may determine and classify characteristics of the defects, such as the type of defect and the severity of the defect. The severity of the defect may represent the extent of the defect and the amount of risk posed by the defect. The defect model may determine the severity of the defect based on the appearance of the defect relative to known appearances of other defects of the same type. For example, the defect model may determine that the oil leak in the second cropped image in FIG. 13 has a greater extent or level of leak than the oil leak in the third cropped image in FIG. 14. The greater extent of leakage may be apparent based on the greater surface area of the bottom surface of the gear case that is covered by oil in the second cropped image relative to the third cropped image. The greater extent of oil leakage in the second cropped image may be an indication that the oil leak is more severe than the oil leak in the third cropped image.

In another example characteristic pertaining to the appearance of the defect, the defect model may determine a quality of the leaked fluid based on an analysis of the image data. For example, the defect model may analyze the intensity (e.g., brightness) of the leaked fluid as an indication of quality (e.g., age). In FIG. 13, the defect model may determine that the leaked oil along the bottom surface of the gear case of the second cropped image has a bright area 1220 within the dark area of the oil leak. The bright area 1220 may represent a portion of the oil leak that reflects light from the flash back to the route optical sensor. Fresher oil may be more reflective than older oil that has accumulated dirt. Based on the appearance of the oil leak, the defect model may determine that the oil leak in the second cropped image is relatively extensive, due to the large coverage area, and that the oil is relatively good quality (e.g., clean). The relatively good quality oil may indicate that the oil leak is relatively new, which suggests that the leak is less severe. In another example, the defect model may consider the location of the fluid leak relative to the equipment in determining the severity of the leak. The defect model may classify the severity of the oil leaks in the second and third cropped images in FIGS. 13 and 14 based on characteristics of the oil leaks shown in the image data, such as the extent of leakage, the location of leakage, and/or the quality of the fluid that is leaking.

The controller may determine the one or more responsive actions to take based on the type and severity of the detected defects. For example, a more severe defect may require a more substantial and immediate intervention than a less severe defect. In response to detecting a severe fluid leak, the controller may immediately reroute the vehicle to a maintenance facility or instruct the vehicle to pull over and shut down until maintenance can be performed. In another example, the controller may respond to a relatively severe defect associated with a traction motor by immediately disabling the traction motor. The controller may distribute increased loads to other, non-defective traction motors to compensate for the disabled traction motor. Alternatively, in response to detecting a minor fluid leak, the controller may schedule the vehicle for future maintenance and/or record information about the minor fluid leak in a vehicle performance and service database. Furthermore, if the relatively minor defect is associated with a traction motor, the controller may maintain the traction motor in operation but reduce or decrease the duty cycle (e.g., load) assigned to the defective traction motor. The controller may increase the duty cycle of one or more non-defective traction motors to compensate for the reduced-duty traction motor.

Figure 15:
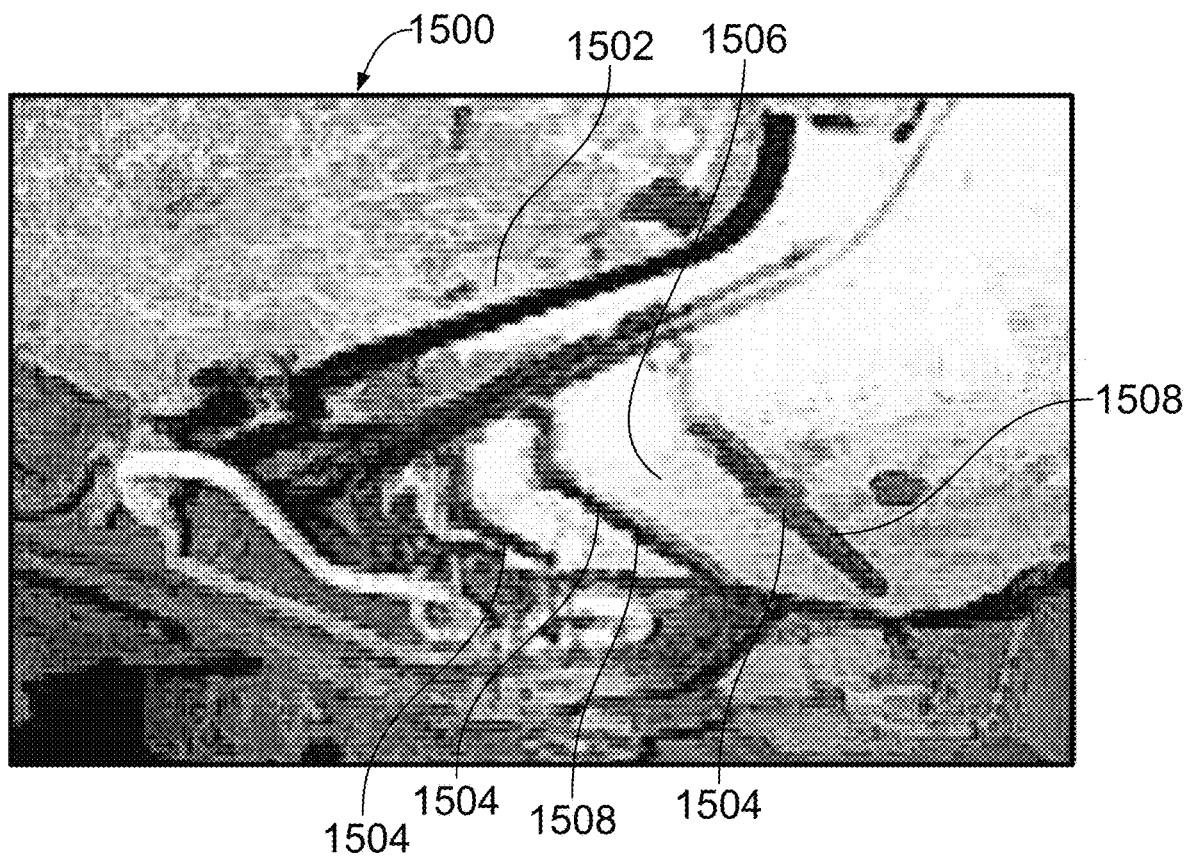
FIG. 15 is an image depicting a vehicle underbody that includes leak visibility enhancement features according to an embodiment.

FIG. 15 is an image 1500 depicting a vehicle underbody 1502 that includes leak visibility enhancement features 1504 according to an embodiment. The leak visibility enhancement features are provided on the underbody to interact with fluid and make fluid leaks more conspicuous (e.g., more apparent, perceptible, and prominent), and therefore more easily detectable by the defect detection system described herein. For example, the leak visibility enhancement features may increase the robustness, effectiveness, and/or accuracy of the defect detection system by increasing the visibility of fluid leaks depicted in the image data generated by the route optical sensor(s). In an example, the leak visibility enhancement features are channels (e.g., grooves) formed into the exterior surface 1506 of the equipment. In an example, the exterior surface may be part of a traction motor gear case. The channels may be integrally formed within the equipment, such as by etching or laser cutting to remove material from the exterior surface of the equipment. The channels may be designed to receive leaking fluid, such as oil, and direct the fluid along a defined path of the channels. The presence of fluid in the channels may be readily apparent in the image data, as shown in FIG. 15. For example, the channels may have linear segments 1508. The linear segments may be parallel to one another, so that the leaking fluid appears as stripes along the exterior surface. The defect model may be designed to detect the presence of fluid within the channels. In another example, the leak visibility enhancement features may be channels that are formed in add-on elements that are secured to the exterior surface of the equipment, rather than integrally formed along the exterior surface of the equipment.

In other examples, the leak visibility enhancement features may include paints or chemicals that are applied to the exterior surface of the equipment and/or add-on elements along the underbody of the vehicle. The paints or chemicals may be selected to enhance the contrast between the fluid and the background surfaces in the image data. For example, the exterior surface of the equipment along the underside of the vehicle may be painted a white or light color to make oil leaks more conspicuous by enhancing the contrast between the dark color of the oil and the light color of the surrounding surface. In another example, a paint or chemical may be applied to the exterior surface that reacts with the leaking fluid by changing color, fluorescing, and/or the like. For example, the paint or chemical may be selected for application to a traction motor gear case that reacts with oil to enhance detectability of an oil leak.

In an embodiment, the defect detection system may be designed to detect missing components from the underbody of the vehicle as defects. For example, if the defect model fails to identify a component of the equipment that is expected to be present within the image data, the defect model may determine that the equipment is defective for failing to have the component.

Figure 16:
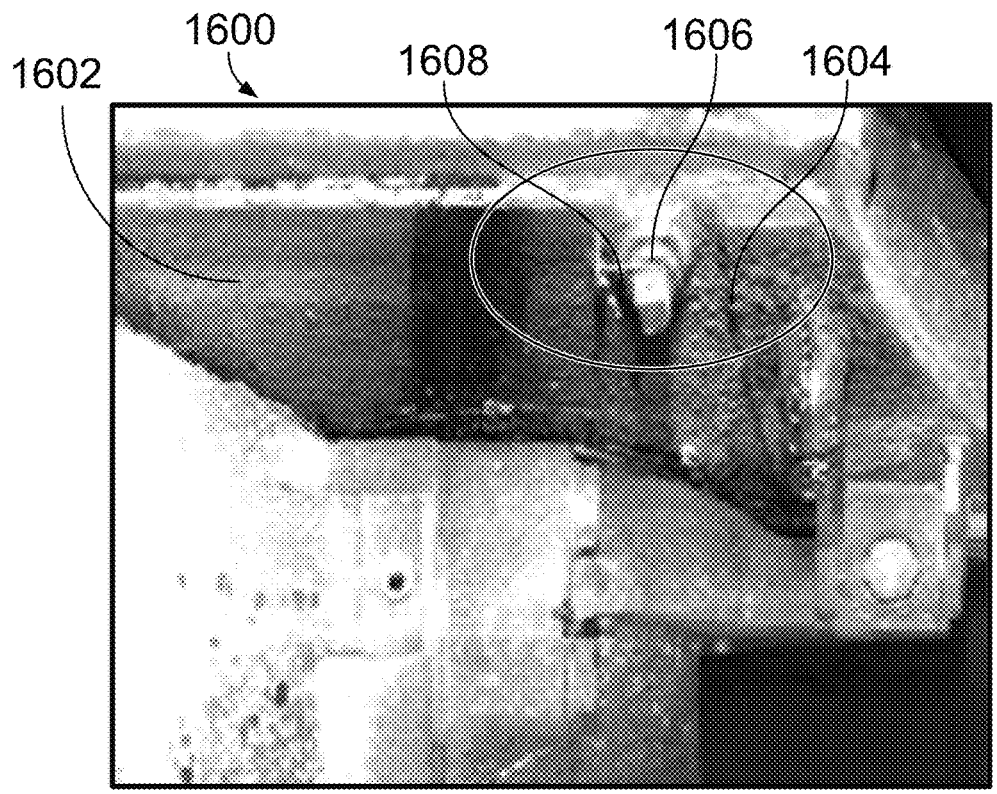
FIG. 16 is an image depicting a vehicle underbody that includes a gear case.

In a specific example, traction motor gear cases may include one or more valves that enable adding fluid to the gear cases and/or removing fluid from the gear cases. FIG. 16 is an image 1600 depicting a vehicle underbody 1602 that includes a gear case 1604. The gear case has a drain valve 1606 that is used to drain fluid from the gear case. The drain valve has a locking element 1608 that secures the drain valve in a closed state to avoid fluid leakage through the drain valve. The locking element in an example is a lockwire. The absence of the lockwire creates a risk of a fluid leak through the drain valve. For example, without the lockwire, a bolt on the drain valve may loosen, creating a leak path through the drain valve. The image in FIG. 16 shows the lockwire installed on the drain valve. The defect model may analyze the image data in the image and determine that the lockwire is intact on the drain valve. As a result, the defect model may determine that the gear case does not have a defective drain valve.

Figure 17:
FIG. 17 is another image depicting a vehicle underbody that includes a gear case.

FIG. 17 is another image 1700 depicting a vehicle underbody 1702 that includes a gear case 1704. The gear case has a drain valve 1706 that is missing a locking element. For example, if the image of FIG. 17 is input to the defect model as one of the cropped images at step 1010 in FIG. 10, the defect model may determine that the drain valve is missing the locking element (e.g., lockwire). The defect model may output a defect result that indicates that the gear case has a defect because the locking element is absent. In response to determining that the locking element is absent, the controller may take one or more responsive actions to avoid or at least reduce the extent of a leak through the drain valve. For example, the controller may generate a notification message which is communicated by the communication device to alert one or more people about the missing locking element. For example, the notification message may be communicated to a service crew that is onboard the vehicle or off-board but associated with the vehicle. In response to receiving the notification message, the service crew may travel to the vehicle and install a spare locking element onto the corresponding drain valve, potentially preventing a fluid leak prior to the leak materializing.

Although FIGS. 16 and 17 show drain valves, the defect detection system may also be designed to detect the presence and absence of locking elements on other types of valves, such as oil filling valves.

Figure 18:
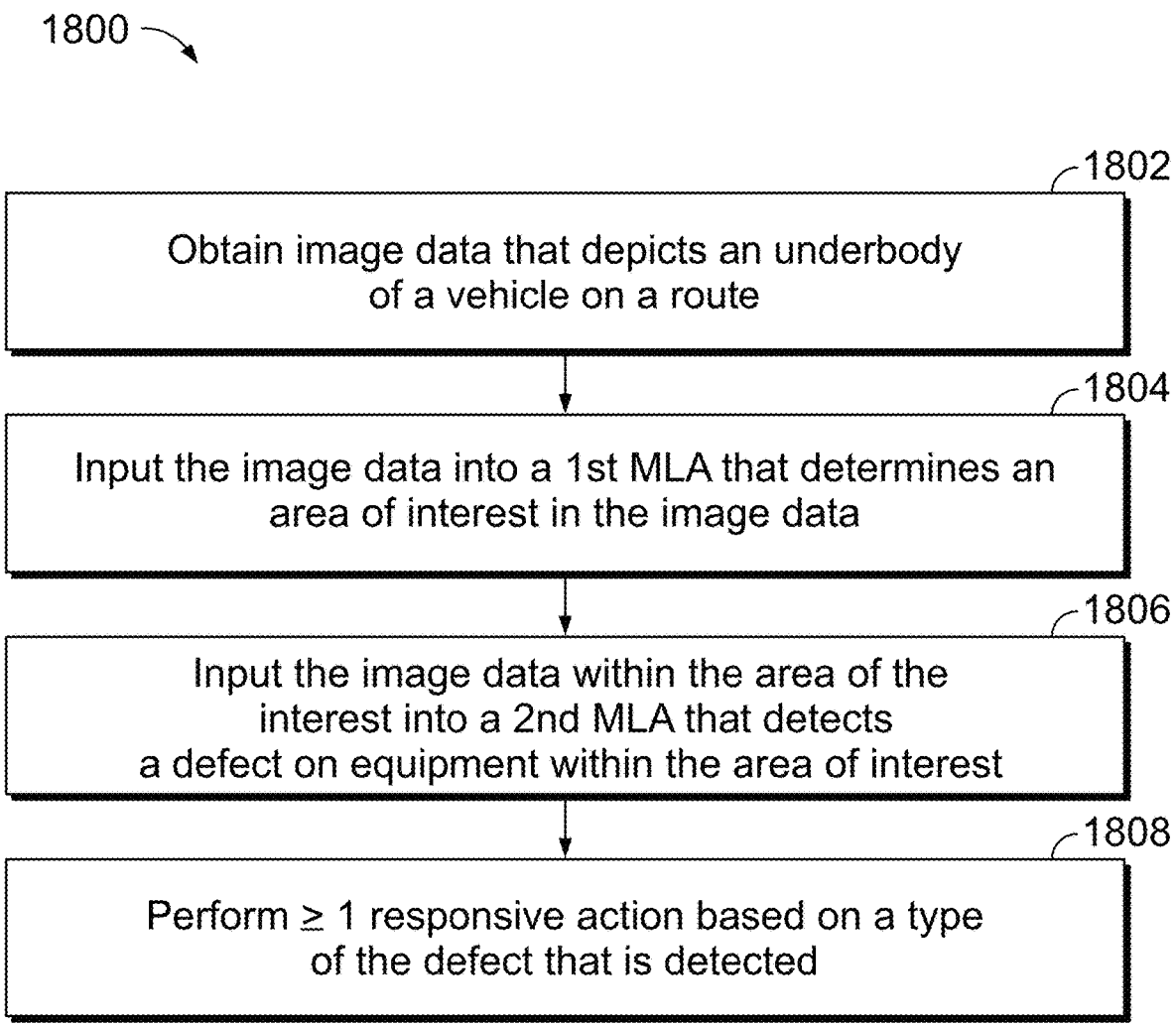
FIG. 18 is a flow chart of a method for detecting defects on equipment along an underbody of a vehicle according to an embodiment.

FIG. 18 is a flow chart 1800 of a method for detecting defects on equipment along an underbody of a vehicle according to an embodiment. The steps of the method may be performed in whole, or in part, by the controller of the defect detection system shown in FIG. 8. The method optionally may include additional steps, fewer steps, and/or different steps than the steps shown in the flow chart 1800, and/or one or more of the steps may be performed in a different sequence than illustrated and described herein. At step 1802, image data is obtained that depicts an underbody of a vehicle on a route. The image data may be generated by one or more route optical sensors disposed along the route. The one or more route optical sensors may be secured along a surface of the route at a middle section of the route along a lateral width of the route. The one or more route optical sensors may have a field of view that is directed upward towards the underbody of the vehicle that is on the route.

At step 1804, the image data is input into a first machine learning algorithm that analyzes the image data and determines an area of interest in the image data. The area of interest contains equipment of interest. For example, the first machine learning algorithm may be trained to detect specific equipment of interest. In response to detecting the equipment of interest, the first machine learning algorithm may determine the area of interest in the image data that encompasses the depicted equipment of interest. For example, the first machine learning algorithm may determine a different area of interest for each instance of the equipment of interest that is detected. The first machine learning algorithm may be the equipment model shown in FIG. 8.

At step 1806, the image data that is within the area of interest is input into a second machine learning algorithm that analyzes the image data and detects a defect on the equipment of interest. The second machine learning algorithm may be the defect model shown in FIG. 8. The second machine learning algorithm may be trained to detect specific types of defects, such as fluid leaks, absent parts that are expected to be present on the equipment, and/or damage that is beyond a threshold associated with general wear and tear. Optionally, the method may include generating one or more cropped images that each includes only the image data that is within one of the determined areas of interest. Inputting the image data into the second machine learning algorithm may be simply inputting the one or more cropped images one at a time as inputs into the second machine learning algorithm. Optionally, the first machine learning algorithm and/or the second machine learning algorithm may be an artificial neural network. The method may also include determining a severity of the defect that is detected.

At step 1808, at least one responsive action is performed based on the type of defect that is detected. The at least one responsive action may include generating a notification message that identifies a type of the defect that is detected. The method may include controlling a communication device to communicate the notification message to at least one of the vehicle or a remote control system. In an example in which the severity of the defect is determined, the at least one responsive action may be performed based on both the type of the defect and the severity of the defect.

In an example, the method may include identifying the vehicle. The notification message may be generated to associate the defect that is detected with an identity of the vehicle. The vehicle may be identified by analyzing second image data generated by a wayside optical sensor. The second image data may depict an exterior surface of the vehicle that is on the route. The second image data may be analyzed by one or more processors to detect one or more identifiers displayed on the vehicle, and the vehicle may be identified based on the one or more identifiers.

Other examples of the at least one responsive action may include scheduling maintenance for the vehicle, disabling the equipment that has the defect, reducing a duty cycle of the equipment that has the defect, and/or the like.

In one or more embodiments, a defect detection system includes one or more route optical sensors disposed along a route and a controller including one or more processors. The one or more route optical sensors may generate image data depicting an underbody of a vehicle that is on the route. The controller is operably connected to the one or more route optical sensors, and may input the image data generated by the one or more route optical sensors into a first machine learning algorithm that determines an area of interest in the image data. The area of interest may contain equipment of interest. The controller may input the image data that is within the area of interest into a second machine learning algorithm that detects a defect on the equipment of interest. The controller may perform at least one responsive action based on a type of defect that is detected.

The first machine learning algorithm may determine the area of interest in the image data that contains a traction motor gear case as the equipment of interest. The second machine learning algorithm may detect at least one of a fluid leak on the traction motor gear case or a missing locking element on a valve of the traction motor gear case as the defect. The controller may generate cropped image data that contains the image data within the area of interest without including the image data that is outside of the area of interest, and the controller may input only the cropped image data into the second machine learning algorithm.

The controller may generate a notification message as one action of the at least one responsive action. The notification message may identify the type of the defect that is detected. The controller may control a communication device to communicate the notification message to at least one of the vehicle or a remote control system. The one or more route optical sensors may be secured along a surface of the route at a middle section of the route, so that the vehicle that is on the route passes directly above the one or more route optical sensors as the vehicle moves along the route. The second machine learning algorithm may determine a severity of the defect that is detected, and the controller may perform the at least one responsive action based on both the type of the defect and the severity of the defect. At least one of the first machine learning algorithm or the second machine learning algorithm may be an artificial neural network.

The controller may perform the at least one responsive action by one or more of scheduling maintenance for the vehicle, disabling the equipment that has the defect, or reducing a duty cycle of the equipment that has the defect. The second machine learning algorithm may detect the defect on the equipment of interest as a fluid leak in response to a fluid of the vehicle interacting with a leak visibility enhancement feature provided on the underbody of the vehicle and depicted in the image data that is analyzed by the second machine learning algorithm. The leak visibility enhancement feature may be one of a channel provided along an exterior surface of the equipment of interest or a paint or chemical configured to at least one of react with the fluid or enhance a color contrast between the fluid and the equipment of interest surrounding the fluid.

The defect detection system may include a wayside optical sensor that generates second image data depicting an exterior surface of the vehicle disposed on the route. The controller may analyze the second image data generated by the wayside optical sensor to detect one or more identifiers that are displayed on the vehicle and identify the vehicle based on the one or more identifiers. The controller may associate the defect that is detected with an identity of the vehicle.

In an embodiment, a method is provided that includes obtaining image data depicting an underbody of a vehicle on a route. The image data is generated by one or more route optical sensors disposed along the route. The method includes inputting the image data into a first machine learning algorithm that determines an area of interest in the image data. The area of interest contains equipment of interest. The method includes inputting the image data that is within the area of interest into a second machine learning algorithm that detects a defect on the equipment of interest, and performing at least one responsive action based on a type of defect that is detected.

The method may include generating a cropped image that includes only the image data within the area of interest. Inputting the image data into the second machine learning algorithm may include inputting the cropped image. Performing the at least one responsive action may include generating a notification message that identifies the type of the defect that is detected. The method may include controlling a communication device to communicate the notification message to at least one of the vehicle or a remote control system. The method may include generating the image data via one or more route optical sensors secured along a surface of the route at a middle section of the route. The one or more route optical sensors may have a field of view that is directed upward towards the underbody of the vehicle that is on the route.

The method may include determining a severity of the defect that is detected, and the at least one responsive action may be performed based on both the type of the defect and the severity of the defect. Performing the at least one responsive action may include one or more of scheduling maintenance for the vehicle, disabling the equipment that has the defect, or reducing a duty cycle of the equipment that has the defect.

The method may include analyzing second image data generated by a wayside optical sensor and depicting an exterior surface of the vehicle that is on the route to detect one or more identifiers displayed on the vehicle, and identifying the vehicle that is on the route based on the one or more identifiers. The method may include generating a notification message as one action of the at least one responsive action. The notification message may be generated to associate the defect that is detected with an identity of the vehicle.

In an embodiment, a defect detection system is provided that includes one or more route optical sensors disposed along a route and a controller that includes one or more processors. The one or more route optical sensors generate image data depicting an underbody of a vehicle that is on the route. The controller is operably connected to the one or more route optical sensors, and inputs the image data generated by the one or more route optical sensors into a first machine learning algorithm that determines an area of interest in the image data. The area of interest contains a traction motor gear case of the vehicle. The controller inputs the image data that is within the area of interest into a second machine learning algorithm that detects a defect on the traction motor gear case. The defect includes at least one of a fluid leak on the traction motor gear case or an absent locking element on a valve of the traction motor gear case. The second machine learning algorithm determines a severity of the defect. The controller performs at least one responsive action based on both a type of defect that is detected and the severity of the defect.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, SVMs, Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

If a system, apparatus, assembly, device, etc. (e.g., a controller, control device, control unit, etc.) includes multiple processors, these processors may be located in the same housing or enclosure (e.g., in the same device) or may be distributed among or between two or more housings or enclosures (e.g., in different devices). The multiple processors in the same or different devices may each perform the same functions described herein, or the multiple processors in the same or different devices may share performance of the functions described herein. For example, different processors may perform different sets or groups of the functions described herein.

As used herein, the "one or more processors" may individually or collectively, as a group, perform these operations. For example, the "one or more" processors can indicate that each processor performs each of these operations, or that each processor performs at least one, but not all, of these operations.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function devoid of further structure.

What is claimed is:

1. A defect detection system comprising:
one or more route optical sensors disposed along a route and configured to generate image data depicting an underbody of a vehicle that is on the route; and
a controller comprising one or more processors and operably connected to the one or more route optical sensors, the controller configured to input the image data generated by the one or more route optical sensors into a first machine learning algorithm that determines an area of interest in the image data, the area of interest containing equipment of interest, the controller configured to input the image data that is within the area of interest into a second machine learning algorithm that detects a defect on the equipment of interest, the controller configured to perform at least one responsive action based on a type of defect that is detected;

wherein the second machine learning algorithm is configured to detect the defect on the equipment of interest as a fluid leak in response to a fluid of the vehicle interacting with a leak visibility enhancement feature, wherein the leak visibility enhancement feature is one of a channel provided along an exterior surface of the equipment of interest or a paint or chemical configured to at least one of react with the fluid or enhance a color contrast between the fluid and the equipment of interest surrounding the fluid.

2. The defect detection system of claim 1, wherein the first machine learning algorithm is configured to determine the area of interest in the image data that contains a traction motor gear case as the equipment of interest.

3. The defect detection system of claim 2, wherein the second machine learning algorithm is configured to detect at least one of a fluid leak on the traction motor gear case or a missing locking element on a valve of the traction motor gear case as the defect.

4. The defect detection system of claim 1, wherein the controller is configured to generate cropped image data that contains the image data within the area of interest without including the image data that is outside of the area of interest, and the controller inputs only the cropped image data into the second machine learning algorithm.

5. The defect detection system of claim 1, wherein the controller is configured to generate a notification message as one action of the at least one responsive action, the notification message identifying the type of the defect that is detected, the controller further configured to control a communication device to communicate the notification message to at least one of the vehicle or a remote control system.

6. The defect detection system of claim 1, wherein the one or more route optical sensors are secured along a surface of the route at a middle section of the route, so that the vehicle that is on the route passes directly above the one or more route optical sensors as the vehicle moves along the route.

7. The defect detection system of claim 1, wherein the second machine learning algorithm is configured to determine a severity of the defect that is detected, and the controller is configured to perform the at least one responsive action based on both the type of the defect and the severity of the defect.

8. The defect detection system of claim 1, wherein at least one of the first machine learning algorithm or the second machine learning algorithm is an artificial neural network.

9. The defect detection system of claim 1, wherein the controller is configured to perform the at least one responsive action by one or more of scheduling maintenance for the vehicle, disabling the equipment that has the defect, or reducing a duty cycle of the equipment that has the defect.

10. The defect detection system of claim 1, wherein the leak visibility enhancement feature provided on the underbody of the vehicle and depicted in the image data that is analyzed by the second machine learning algorithm.

11. The defect detection system of claim 1, further comprising a wayside optical sensor configured to generate second image data depicting an exterior surface of the vehicle disposed on the route, the controller configured to analyze the second image data generated by the wayside optical sensor to detect one or more identifiers that are displayed on the vehicle and identify the vehicle based on the one or more identifiers, the controller further configured to associate the defect that is detected with an identity of the vehicle.

12. A method comprising:
obtaining image data depicting an underbody of a vehicle on a route, the image data generated by one or more route optical sensors disposed along the route;
inputting the image data into a first machine learning algorithm that determines an area of interest in the image data, the area of interest containing equipment of interest;
inputting the image data that is within the area of interest into a second machine learning algorithm that detects a defect on the equipment of interest; and
performing at least one responsive action based on a type of defect that is detected,
wherein the second machine learning algorithm is configured to detect the defect on the equipment of interest as a fluid leak in response to a fluid of the vehicle interacting with a leak visibility enhancement feature, wherein the leak visibility enhancement feature is one of a channel provided along an exterior surface of the equipment of interest or a paint or chemical configured to at least one of react with the fluid or enhance a color contrast between the fluid and the equipment of interest surrounding the fluid.

13. The method of claim 12, further comprising generating a cropped image that includes only the image data within the area of interest, wherein inputting the image data into the second machine learning algorithm comprises inputting the cropped image.

14. The method of claim 12, wherein performing the at least one responsive action includes generating a notification message that identifies the type of the defect that is detected, the method further comprising controlling a communication device to communicate the notification message to at least one of the vehicle or a remote control system.

15. The method of claim 12, further comprising generating the image data via one or more route optical sensors secured along a surface of the route at a middle section of the route, the one or more route optical sensors having a field of view that is directed upward towards the underbody of the vehicle that is on the route.

16. The method of claim 12, further comprising determining a severity of the defect that is detected, and the at least one responsive action is performed based on both the type of the defect and the severity of the defect.

17. The method of claim 12, wherein performing the at least one responsive action comprises one or more of scheduling maintenance for the vehicle, disabling the equipment that has the defect, or reducing a duty cycle of the equipment that has the defect.

18. The method of claim 12, further comprising analyzing second image data generated by a wayside optical sensor and depicting an exterior surface of the vehicle that is on the route to detect one or more identifiers displayed on the vehicle;
identifying the vehicle that is on the route based on the one or more identifiers; and
generating a notification message as one action of the at least one responsive action, the notification message generated to associate the defect that is detected with an identity of the vehicle.

19. A defect detection system comprising:
one or more route optical sensors disposed along a route and configured to generate image data depicting an underbody of a vehicle that is on the route; and
a controller comprising one or more processors and operably connected to the one or more route optical sensors, the controller configured to input the image data generated by the one or more route optical sensors into a first machine learning algorithm that determines an area of interest in the image data, the area of interest containing a traction motor gear case of the vehicle, the controller configured to input the image data that is within the area of interest into a second machine learning algorithm that detects a defect on the traction motor gear case, the defect including at least one of a fluid leak on the traction motor gear case or an absent locking element on a valve of the traction motor gear case in response to a fluid of the vehicle interacting with a leak visibility enhancement feature, wherein the leak visibility enhancement feature is one of a channel provided along an exterior surface of the traction motor gear case or a paint or chemical configured to at least one of react with the fluid or enhance a color contrast between the fluid and the traction motor gear case surrounding the fluid, the second machine learning algorithm further configured to determine a severity of the defect, and the controller configured to perform at least one responsive action based on both a type of defect that is detected and the severity of the defect.

* * * * *